(12) United States Patent
Mancuso

(10) Patent No.: US 12,033,050 B1
(45) Date of Patent: Jul. 9, 2024

(54) GENERATING CONTEXT SPECIFIC ELECTRONIC COMMUNICATIONS UTILIZING A NEURAL NETWORK

(71) Applicant: Dropbox, Inc., San Francisco, CA (US)

(72) Inventor: Devin Mancuso, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/339,833

(22) Filed: Jun. 22, 2023

Related U.S. Application Data

(60) Provisional application No. 63/505,797, filed on Jun. 2, 2023.

(51) Int. Cl.
*G06N 3/02* (2006.01)
*H04L 51/216* (2022.01)

(52) U.S. Cl.
CPC ............. *G06N 3/02* (2013.01); *H04L 51/216* (2022.05)

(58) Field of Classification Search
CPC ........... G06N 3/02; G06N 20/00; H04L 51/02
See application file for complete search history.

(56) References Cited

U.S. PATENT DOCUMENTS

| | | | |
|---|---|---|---|
| 10,666,594 B2 | 5/2020 | Pfriem et al. | |
| 11,010,555 B2 | 5/2021 | Terry et al. | |
| 11,076,007 B2 | 7/2021 | Laird-McConnell et al. | |
| 11,436,408 B2 * | 9/2022 | Pailla | H04L 51/02 |
| 11,575,637 B2 | 2/2023 | Bernstein et al. | |
| 2019/0005021 A1 * | 1/2019 | Miller | G06Q 10/04 |
| 2020/0273079 A1 | 8/2020 | Raviv et al. | |

(Continued)

FOREIGN PATENT DOCUMENTS

| WO | WO-2022075591 A1 * | 4/2022 |
|---|---|---|
| WO | WO-2023175089 A1 * | 9/2023 |

OTHER PUBLICATIONS

Luo Z., "An Intelligent Email Response System (IERS)," QSPACE, Graduate Theses, Queen's Graduate Theses and Dissertations, Jun. 2023, 112 pages, Retrieved from the Internet: URL: http://hdl.handle.net/1974/31693.

(Continued)

*Primary Examiner* — Caroline H Jahnige
(74) *Attorney, Agent, or Firm* — Keller Preece PLLC

(57) ABSTRACT

This disclosure describes embodiments of systems, methods, and non-transitory computer readable storage media that can utilize language neural networks to automatically generate draft electronic communications for a user account. For example, the disclosed systems leverage composition parameters of a user account (determined from historical electronic communications of the user account, digital content items corresponding to the user account, and/or other application data) with a neural network to automatically generate draft electronic communications that reflect a composition style of a user account and accurately addresses a context of a communication thread. In addition, the disclosed systems can generate electronic communications using the communication generation neural network and save the electronic communication as a draft (e.g., for review by a user of the user account) and/or automatically transmit the electronic message to a recipient user account.

20 Claims, 13 Drawing Sheets

(56) References Cited

U.S. PATENT DOCUMENTS

| | | |
|---|---|---|
| 2020/0334639 A1* | 10/2020 | Ramakrishnan ........ H04L 51/08 |
| 2021/0014652 A1* | 1/2021 | Shivashankaraiah ... H04L 51/52 |
| 2022/0006761 A1 | 1/2022 | Magliozzi et al. |
| 2023/0043260 A1 | 2/2023 | Kiyanda et al. |
| 2023/0101224 A1* | 3/2023 | Singh .................. G06F 9/44505 |
| | | 707/770 |
| 2023/0155965 A1 | 5/2023 | Pastrana |
| 2023/0188483 A1 | 6/2023 | Soiaporn et al. |

OTHER PUBLICATIONS

Mittal A., et al., "Automatic Email Response System in E-learning," Proceedings of the International Conference on Advances in Information Communication Technology & Computing (AICTC), Aug. 2016, Article No. 89, 5 pages, Retrieved from the Internet: URL: https://dl.acm.org/doi/10.1145/2979779.2979868.

* cited by examiner

GENERATING CONTEXT SPECIFIC ELECTRONIC COMMUNICATIONS UTILIZING A NEURAL NETWORK

CROSS-REFERENCE TO RELATED APPLICATIONS

This application claims priority to and the benefit of U.S. Provisional Patent Application No. 63/505,797, filed on Jun. 2, 2023, which is incorporated herein by reference in its entirety.

BACKGROUND

In recent years, online systems have increasingly implemented and integrated digital tools to manage and/or create electronic communications. For example, some existing digital communication systems provide tools for users to create, modify, delete, and/or send electronic messages via computing devices to other users (e.g., e-mail, instant messaging, SMS). Furthermore, in some cases, existing digital communication systems also provide tools to configure rule-based automation settings to create, modify, and/or send electronic messages between users. Despite such existing digital communication systems providing tools to create and send electronic communications between devices, these existing systems face a number of technical shortcomings in electronic communications. Indeed, to enable the creation of, modification of, and/or transmittal of electronic communications, existing electronic communication systems often provide inefficient, rigid, and inaccurate tools that require time intensive interactions to generate and transmit electronic communications.

For example, many existing digital communication systems provide inefficient user interfaces for creating, editing, organizing, and/or responding to electronic communications. Indeed, in many cases, existing electronic communication systems require time intensive user interactions to generate electronic communications from a blank slate for various electronic communications (e.g., hundreds of emails, messages). Oftentimes, utilizing existing electronic communication systems to create, organize, and/or transmit electronic communications can be time intensive and require a significant number of computational resources to respond to a substantial number of communications and/or navigate between various user interfaces to gather information for the created electronic communications.

To address these inefficiencies, many existing electronic communication systems provide rigid automation tools to create and/or organize electronic communications. For instance, oftentimes, existing electronic communication systems provide rigid rule-based triggers that perform specific actions for electronic communications upon detection of criteria that satisfy the rule-based triggers. However, such rule-based triggers are rigid and fail to easily scale for a diverse set of situations that are present through the increasing utilization of electronic communication approaches. For example, many rule-based trigger tools enabled by existing electronic communication systems are capable of providing simple functionality such as moving electronic messages to specific folders when a particular term is detected within a message and/or setting user-configured auto reply messages that automatically send during a user-configured date or time. Such rule-based triggers are inflexible and unable to handle a diverse set of situations, but rather only specific user specified situations (i.e., covered by specific rule-based triggers). Indeed, in many cases, existing electronic communications systems require configuring and setting an increasingly inefficient number of rule-based triggers to cover a substantial number of user-defined situations.

In addition to being inflexible, many existing electronic communication systems provide rigid automation tools that are inaccurate. In particular, rule-based trigger tools are often unintelligent and unable to accurately react to an electronic message. For instance, due to the rigid, user-configured responses within many existing electronic communication rule-based trigger tools, existing electronic communication systems inaccurately transmit a standard and/or uniform electronic message to many messages (i.e., without correctly addressing a context and/or situation described in a message).

SUMMARY

This disclosure describes one or more embodiments of systems, methods, and non-transitory computer readable storage media that provide benefits and/or solve one or more of the foregoing and other problems in the art. In particular, the disclosed systems utilize language neural networks to intelligently and automatically generate draft electronic communications for a user account. For example, the disclosed systems leverage composition parameters (e.g., tones and/or styles) of a user account (determined from historical electronic communications of the user account, digital content items corresponding to the user account, and/or other application data) with a neural network to automatically generate draft electronic communications that reflect a composition style of a user account and accurately addresses a context of a communication thread. In addition, the disclosed system can generate electronic communications using the communication generation neural network and save the electronic communication as a draft (e.g., for review by a user of the user account) and/or automatically transmit the electronic message to a recipient user account.

BRIEF DESCRIPTION OF THE DRAWINGS

The detailed description is described with reference to the accompanying drawings in which.

DETAILED DESCRIPTION

Figure 1:
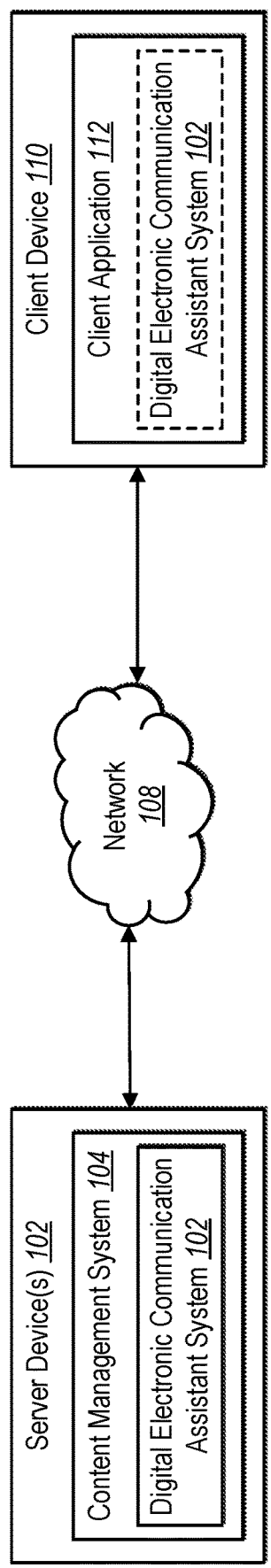
FIG. 1 illustrates a schematic diagram of an example system in which a digital electronic communication assistant system operates in accordance with one or more implementations.

This disclosure describes one or more embodiments of a digital electronic communication assistant system that utilizes a communication generation neural network, fine-tuned to data corresponding to a user account, to intelligently and automatically generate electronic communications for the user account. Indeed, in one or more implementations, the digital electronic communication assistant system accesses an electronic communication thread of a user account. Moreover, in one or more embodiments, the digital electronic communication assistant system determines composition parameters for generating electronic communications for the user account (via a machine learning analysis of content, communications, and data corresponding to the user account and/or via user selected composition parameters). In addition, in one or more implementations, the digital electronic communication assistant system generates, utilizing a communication generation neural network with the one or more composition parameters and the electronic communication thread, an electronic communication to include within the electronic communication thread as a response to another electronic communication (with the electronic communication thread).

In some instances, the digital electronic communication assistant system utilizes a communication analysis model to analyze an accessed communication thread and/or historical communication threads of a user account to determine one or more communication parameters. Indeed, a communication parameter can include a tone of communication and/or a style of communication. In some instances, the digital electronic communication assistant system utilizes user selected (or user configured) composition parameters (from settings of a user account) to determine the one or more communication parameters (e.g., a user selection to utilize a polite composition tone, a formal composition tone, and/or an informal, friendly composition tone).

Furthermore, in one or more embodiments, the digital electronic communication assistant system utilizes a communication generation neural network to generate an electronic communication for a user account. In some cases, the digital electronic communication assistant system utilizes the composition parameters determined for the user account with the electronic communications within an electronic communication thread as prompts for the communication generation neural network to cause the communication generation neural network to generate an electronic communication that accurately reflects the context of the electronic communication thread and the composition parameters determined for the user account. In one or more implementations, the digital electronic communication assistant system further fine tunes the communication generation neural network to utilize digital content items and/or application data (e.g., other SAAS applications) connected to the user account in generated electronic communications.

Additionally, in one or more instances, the digital electronic communication assistant system generates and/or provides various graphical user interfaces to interact with the dynamic electronic communications generated by the communication generation neural network. Indeed, in some cases, the digital electronic communication assistant system integrates the communication generation neural network within a command-driven user interface that provides search and/or execution capabilities over various interconnected applications and/or digital content stored on an online or a "cloud" storage system. In particular, the digital electronic communication assistant system can cause the communication generation neural network to generate an electronic communication based on a command and/or request provided within the command-drive user interface using the various applications and/or digital content items connected to the command-driven user interface.

In one or more embodiments, the digital electronic communication assistant system integrates the communication generation neural network within a plugin and/or extension that operates within various electronic communication platforms. For instance, the digital electronic communication assistant system can receive a request to generate an electronic communication for an electronic communication thread within an electronic communication platform (e.g., an email website within a web browser, an email application, an instant messaging application) and cause the plugin-based communication generation neural network to generate a responsive electronic communication. In some instances, the digital electronic communication assistant system integrates the communication generation neural network (that utilizes content corresponding to the user account) within a keyboard plugin that generates dynamic electronic communications across various messaging applications.

Furthermore, in one or more embodiments, the digital electronic communication assistant system utilizes the communication generation neural network to generate electronic communications for a various number of electronic communication threads and saves the electronic communications as drafts for review by a user account. To enable review of the generated draft electronic communications, in one or more instances, the digital electronic communication assistant system displays a notification tray interface that represents generated draft electronic communications with selectable options to transmit the generated draft electronic communication, modify the generated draft electronic communication, or reject the generated draft electronic communication. Additionally, in some cases, the digital electronic communication assistant system automatically sends (or transmits) generated electronic communications to recipient user accounts in electronic communication threads.

Moreover, in one or more implementations, the digital electronic communication assistant system also enables modification of a generated electronic communication. For instance, the digital electronic communication assistant system receives a prompt to modify a generated electronic communication from a client device of a user account. In response to the modification prompt, the digital electronic communication assistant system utilizes the communication generation neural network with the modification prompt (e.g., "change the message to a formal tone," "change the meeting time to noon") with the communication generation neural network to modify the generated electronic communication to reflect the modification prompt.

The digital electronic communication assistant system provides several technical advantages over existing electronic communication systems. For example, the digital electronic communication assistant system provides efficient, flexible, and accurate tools to generate electronic communications within electronic communication threads. In particular, the digital electronic communication assistant system provides a practical application that utilizes a communication generation neural network to intelligently and dynamically generate various electronic communications responsive to electronic communication threads to emulate user-specific composition parameters based on content collections and/or historical electronic communications corresponding to the user account.

For example, unlike many existing systems that require time intensive user interactions to generate electronic communications, the digital electronic communication assistant system can generate numerous electronic communications that emulate user-specific composition parameters based on content collections and/or historical electronic communications corresponding to the user account. Indeed, in many cases, the digital electronic communication assistant system utilizes a communication generation neural network to automatically generate electronic communications for a user account and/or from simple request commands from a user of a user account (e.g., simple text and/or voice prompts, such as "reply to Tim's email," "send Tim yesterday's meeting notes with a summary of the meeting," "provide Tim with instructions on getting here from the airport"). For instance, the digital electronic communication assistant system enables the generation of electronic communications with information from various content sources connected to the user account without requiring excessive user navigation between multiple interfaces and/or excessive user interaction to generate electronic communications. Indeed, in some cases, the digital electronic communication assistant system automatically generates draft electronic communications to respond to a substantial number of electronic communications to reduce computational resources and battery consumption utilized for screen time during user interaction and navigation between editors and/or threads to respond to the substantial number of electronic communications.

In addition to efficiency, the digital electronic communication assistant system also improves the flexibility of electronic communication tools. In particular, in contrast to rigid rule-based automation tools, the digital electronic communication assistant system enables flexible and adaptive creation of intelligent and dynamic electronic communications responsive to various (and diverse) electronic communication threads to emulate user-specific composition parameters based on content collections and/or historical electronic communications corresponding to the user account. Indeed, the digital electronic communication assistant system utilizes the communication generation neural network with the user account content to generate dynamic messages for diverse electronic communications to easily scale to responding to a large number of diverse electronic communications with reduced user interaction.

Additionally, unlike many rigid rule-based automation tools from existing electronic communication systems, the digital electronic communication assistant system accurately generates electronic communications by leveraging composition parameters of a user account and context from the communication thread (as a prompt). Indeed, the digital electronic communication assistant system utilizes the communication generation neural network to directly respond to an electronic communication with information from content associated with the user account while also emulating a composition style of the user account. In many cases, the digital electronic communication assistant system accurately and correctly generates electronic communications without utilizing a template and/or rigid preset reply messages.

As illustrated by the foregoing discussion, the present disclosure utilizes a variety of terms to describe features and benefits of the digital electronic communication assistant system. Additional detail is now provided regarding the meaning of these terms. As used herein, the term "content" (or sometimes referred to as "content item," "content," "media content file," "digital content," or "media content") refers to discrete data representation of a document, file, image, or video. In particular, a digital content item can include, but is not limited to, a digital image (file), a digital video (file), an electronic document (e.g., text file, spreadsheet, PDF, forms), and/or electronic communication (e.g., one or more instant messages, e-mails).

Furthermore, as used herein, the term "electronic communication thread" refers to a collection of electronic messages between one or more entities (e.g., users). For instance, an electronic communication thread can include a list or collection of messages organized by time stamps and/or senders. In one or more instances, an electronic communication thread represents a conversation between one or more user accounts (or a chat bot). For instance, an electronic communication thread can include, but is not limited to, an email thread, an instant messaging thread, an SMS text message thread, and/or a forum thread.

Furthermore, as used herein, the term "electronic communication" refers to digital content (e.g., text, images, videos, audio) that is created as a digital message for transmission to one or more users (and/or a third party entity, such as a chatbot). In particular, an electronic communication includes a digital message that presents information to one or more users (and/or a third party entity, such as a chatbot). For example, an electronic communication includes an email, a SMS text message, an instant message, a voice message, a video message, and/or an online post (e.g., within an online bulletin and/or a social media platform).

As further used herein, the term "composition parameter" refers to a setting and/or variable that represents various compositional styles, tones, and/or content associated with a user account. In particular, a composition parameter includes a setting and/or variable that indicates a particular compositional style, tone, and/or content utilized by a user account. For instance, a composition parameter includes a setting for a composition style (e.g., formal, casual, business casual, business formal) and/or a composition tone (e.g., funny, serious, friendly, assertive). In some cases, a composition parameter includes a setting and/or variable to utilize various content within a generated electronic communication (e.g., simple vocab words, difficult vocab words, including and/or avoiding various user data, such as schedule, documents). In some cases, the composition parameters can include particular types of vocabulary utilized by a user account.

As used herein, the term "communication analysis model" refers to computer-based model that determines communication parameters for a user account. In one or more embodiments, a communication analysis model includes a machine learning model that utilizes user data (e.g., user configured composition settings, user activity, historical electronic communication threads, a current electronic communication thread, and/or digital content items corresponding to the user account) to classify and/or predict one or more composition parameters for a user account. In some cases, the communication analysis model includes a classification machine learning model and/or a natural language processing model. In some implementations, the communication analysis model includes a rule-based model that utilizes various user configured composition settings to determine composition parameter(s) for a user account.

Additionally, as used herein, the term "communication generation neural network" refers to a machine learning model that generates electronic communications from a prompt. In one or more implementations, the communication generation neural network utilizes an electronic communication thread as a prompt to generate a responsive electronic communication. In one or more instances, the communication generation neural network includes a machine learning model trained and/or fine-tuned to generate electronic communications from a prompt (e.g., an electronic communication thread) utilizing various user data to mimic a composition style of a user account and to contextualize the generated electronic communication based on content related to the user account.

Furthermore, as used herein, the term "machine learning model" refers to a computer representation that can be tuned (e.g., trained) based on inputs to approximate unknown functions. Indeed, a machine learning model can refer to a computer representation that can be tuned (e.g., trained) based on inputs to generate electronic communications (or other digital content, such as documents). Additionally, a machine learning model can refer to a computer representation that can be tuned (e.g., trained) based on inputs to analyze text and/or images. In one or more implementations, parameters of a machine learning model can be adjusted or trained to create a communication generation neural network that intelligently electronic communications from prompts (e.g., text within an electronic communication thread) that also emulate one or more composition styles from a user account and leverages content items corresponding to the user account.

For instance, a machine learning model can include, but is not limited to, one or more convolutional neural networks, recurrent neural networks, generative adversarial neural networks), residual neural networks, diffusion models, or a combination thereof. Additionally, a machine learning model can also include, but is not limited to one or more large language models, differentiable function approximators, contrastive language-image pre-training models, clustering models, convolution neural network-based image classifiers, recurrent neural network-based image classifiers, Term Frequency Inverse Document Frequency (TF-IDF) encoders, Word2Vecs, matrix factorization vector learning approaches, local context window vector learning approaches, Global Vectors for Word Representation (GloVe), Bidirectional Encoder Representations from Transformers, natural language processing approaches (e.g., spaCy), and/or generative pre-trained transformer models.

Turning now to the figures, FIG. 1 illustrates a schematic diagram of one implementation of a system 100 (or environment) in which a digital electronic communication assistant system 106 operates in accordance with one or more implementations. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a content management system 104, which further includes the digital electronic communication assistant system 106. In particular, the content management system 104 provides functionality by which a user (not shown in FIG. 1) can use the client device 110 to generate, manage, and/or store digital content. For example, a user can generate digital content using the client device 110. Subsequently, a user utilizes the client device 110 to send the digital content to the content management system 104 hosted on the server device(s) 102 via the network 108. The content management system 104 can then provide many options that the client device 110 may utilize (and a user selects or otherwise interacts with) to store the digital content, organize the digital content, share the digital content, and subsequently search for, access, view, and/or modify the digital content. Additional detail regarding the content management system 104 is provided below (e.g., in relation to FIG. 13 and the content management system 1302). Furthermore, the server device(s) 102 can include, but are not limited to, a computing (or computer) device (as explained below with reference to FIG. 12).

Additionally, in one or more embodiments, the content management system 104 also provides functionalities to create, modify, send, and/or receive electronic communications. For instance, the content management system 104 can provide (e.g., via an application, web application, plugin, extension) one or more functionalities create, modify, send, and/or receive electronic communications. For instance, the content management system 104 can host an email application and/or integrate with an email application (or various other electronic communication applications, such as, instant messaging applications and/or SMS texting applications).

As further shown in FIG. 1, the system 100 includes the client device 110. In one or more implementations, the client device 110 include, but are not limited to, mobile devices (e.g., smartphones, tablets), laptops, desktops, or other types of computing devices, as explained below with reference to FIG. 12. For example, the client device 110 can be operated by users to perform various functions (e.g., via the content management system application 112) such as, but not limited to, creating, receiving, viewing, modifying, and/or transmitting digital content and/or electronic communications, receiving and/or transmitting content creation requests and/or electronic communications, configuring user account or application settings of the content management system 104, and/or electronically communicating with other user accounts of the content management system 104 via electronic communications. Although FIG. 1 illustrates a single client device 110, in one or more embodiments, the system 100 can include various numbers and types of client devices.

To access the functionalities of the content management system 104 (and the digital electronic communication assistant system 106), a user can interact with the content management system application 112 via the client device 110. The content management system application 112 can include one or more software applications installed on the client device 110. In some implementations, the content management system application 112 can include one or more software applications that are downloaded and installed on the client device 110 to include an implementation of the digital electronic communication assistant system 106. In some embodiments, the content management system application 112 is hosted on the server device(s) 102 and is accessed by the client device 110 through a web browser and/or another online platform. Moreover, the content management system application 112 can include functionalities to access or modify a file storage structure stored locally on the client device 110 and/or hosted on the server device(s) 102.

As just mentioned and as shown in FIG. 1, the server device(s) 102 include the digital electronic communication assistant system 106 (through the content management system 104). In one or more instances, the digital electronic communication assistant system 106 accesses one or more electronic communication threads of a user account of the client device 110. Furthermore, the digital electronic communication assistant system 106 can generate, utilizing a communications generation neural network, electronic communications responsive to the one or more electronic communication threads (in accordance with one or more implementations herein).

Although FIG. 1 illustrates the digital electronic communication assistant system 106 being implemented by a particular component and/or device within the system 100 (e.g., the server device(s) 102), in some embodiments, the digital electronic communication assistant system 106 is implemented, in whole or part, by other computing devices and/or components in the system 100. For example, in some implementations, the digital electronic communication assistant system 106 is implemented on the client device 110 within the content management system application 112. More specifically, in some embodiments, some or all of the digital electronic communication assistant system 106 is implemented by the server device(s) 102 and accessed by the client device 110 through the content management system application 112, web browsers, and/or other online platforms (as described above). In some instances, some or all of the digital electronic communication assistant system 106 is implemented by the client device 110 on the content management system application 112 and communicates data (or changes to data) to the content management system 104 on the server device(s) 102.

Additionally, as illustrated in FIG. 1, the system 100 includes the network 108 that enables communication between components of the system 100. In certain implementations, the network 108 includes a suitable network and may communicate using any communication platforms and technologies suitable for transporting data and/or communication signals between the server device(s) 102 and the client device 110. An example of the network 108 is described with reference to FIG. 12 and/or FIG. 13. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
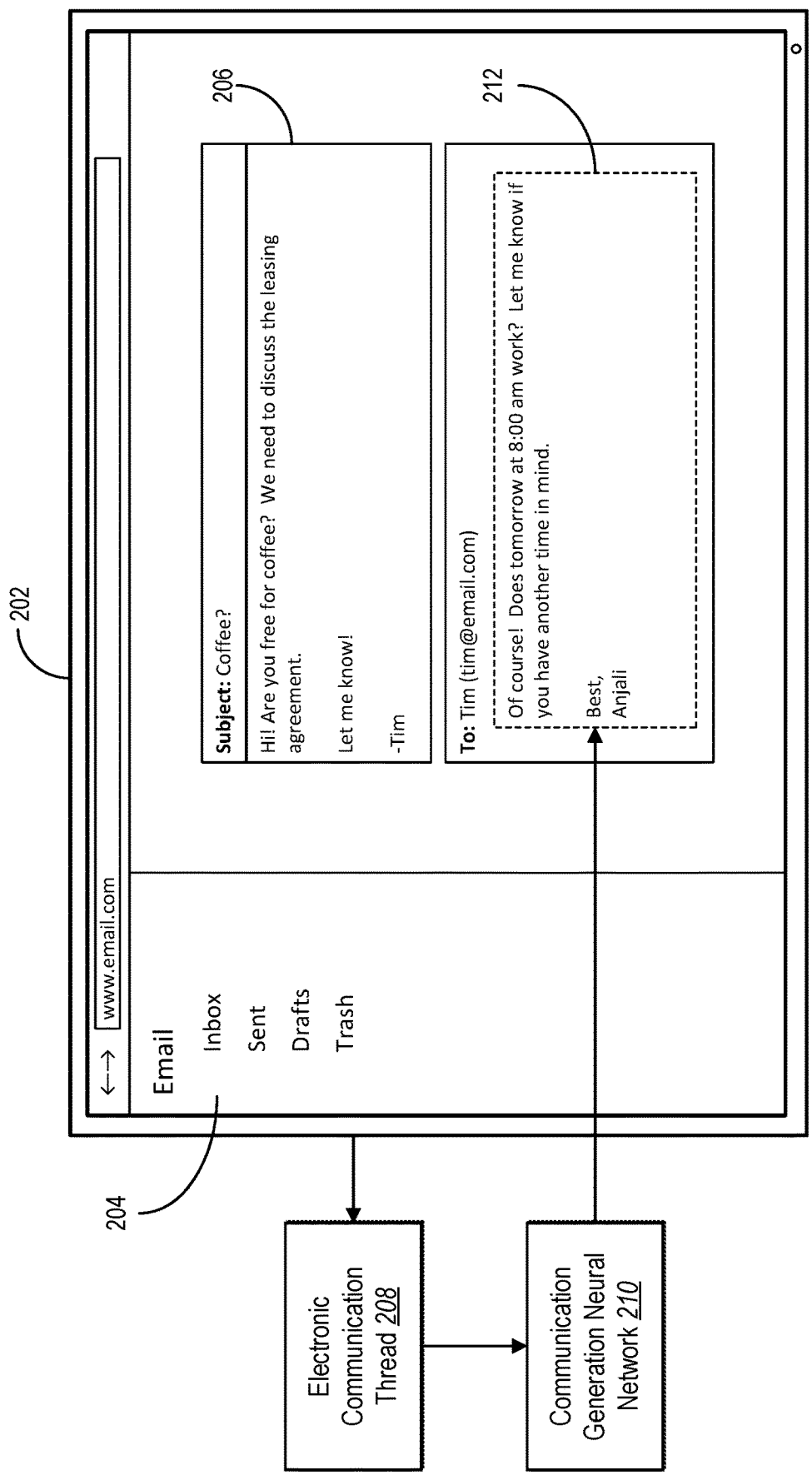
FIG. 2 illustrates an exemplary workflow of a digital electronic communication assistant system generating an electronic communication in accordance with one or more implementations.

As mentioned above, the digital electronic communication assistant system 106 can intelligently and automatically generate electronic communications for a user account (of a content management system). For example, FIG. 2 illustrates an exemplary workflow of the digital electronic communication assistant system 106. Indeed, FIG. 2 illustrates the digital electronic communication assistant system 106 generating, utilizing a communication generation neural network, an electronic communication for a user account based on an electronic communication thread.

As shown in FIG. 2, the digital electronic communication assistant system 106 identifies (or accesses) an electronic communication thread 208 within an electronic communication platform user interface 204 of a client device 202 (having an electronic communication 206). Furthermore, as shown in FIG. 2, the digital electronic communication assistant system 106 utilizes the electronic communication thread 208 with a communication generation neural network 210 to generate an electronic communication 212 (for the user account) that is responsive to the electronic communication 206 (e.g., an email with a request to meet for coffee). As shown in FIG. 2, the digital electronic communication assistant system 106 generates the electronic communication 212 to emulate composition parameters of a user account while providing an accurate response to the electronic communication 206.

Although one or more embodiments herein illustrate the digital electronic communication assistant system 106 utilizing the communication generation neural network to generate email responses, the digital electronic communication assistant system 106 can generate various types of electronic communications for various electronic communication threads. For instance, the digital electronic communication assistant system 106 can generate instant messages within an instant messaging thread. Further, the digital electronic communication assistant system 106 can generate text messages within a text messaging thread.

Figure 3:
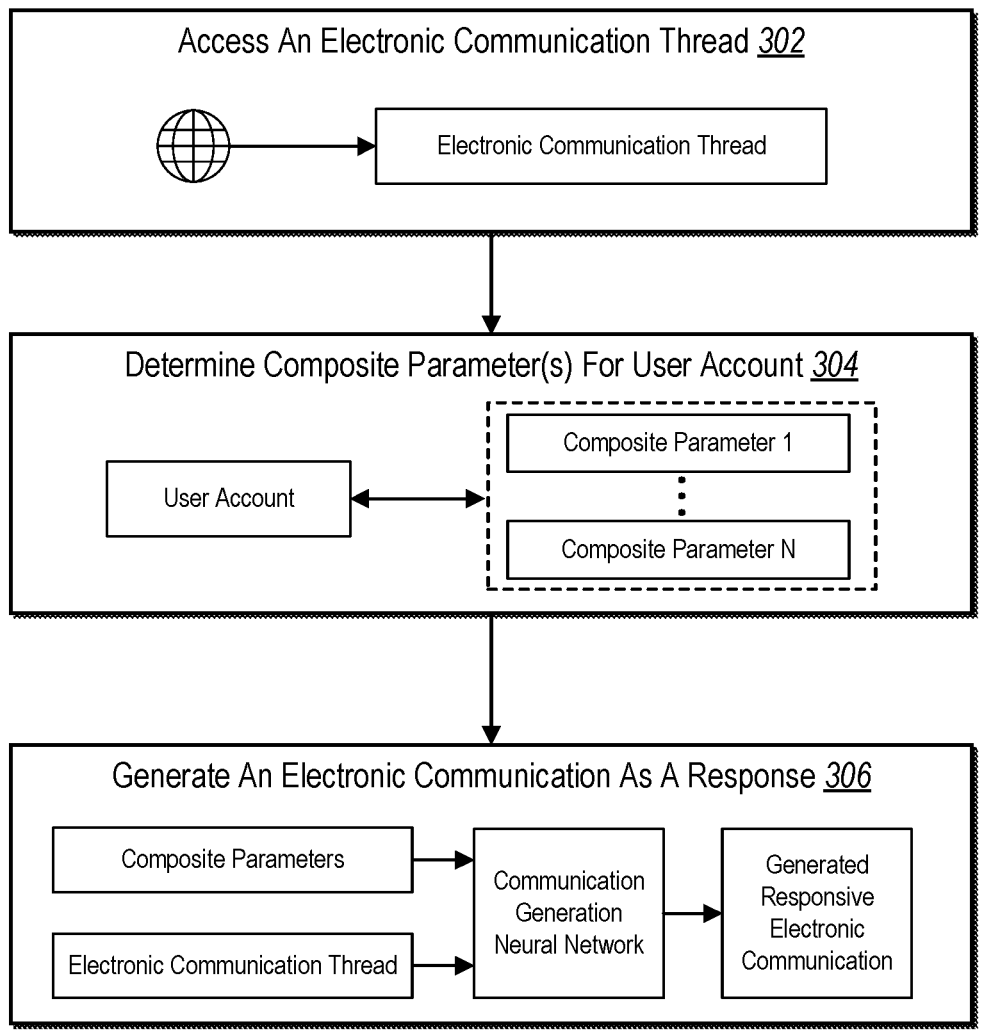
FIG. 3 illustrates an overview of a digital electronic communication assistant system utilizing a communication generation neural network to automatically generate electronic communications for a user account in accordance with one or more implementations.

Moreover, FIG. 3 illustrates an overview of the digital electronic communication assistant system 106 utilizing a communication generation neural network, fine-tuned to data corresponding to a user account, to intelligently and automatically generate electronic communications for the user account. In particular, FIG. 3 illustrates the digital electronic communication assistant system 106 accessing an electronic communication thread (from a user account), determining composition parameter(s) for the user account, and generating an electronic communication as a response (using a communication generation neural network).

For instance, as shown in act 302 of FIG. 3, the digital electronic communication assistant system 106 accesses an electronic communication thread of a user account. For instance, the digital electronic communication assistant system 106 can access an electronic communication thread via integration with, communications with and/or data requests with electronic communication servers, such as, but not limited to, an email server, an instant messaging server, a messaging thread server, and/or a text message thread server. In some cases, the digital electronic communication assistant system 106 detects an electronic communication thread via on screen detection through a plugin (upon receiving user permission to detect content on a user interface).

Furthermore, as shown in act 304 of FIG. 3, the digital electronic communication assistant system 106 determines a composition parameter(s) for the user account. For example, the digital electronic communication assistant system 106 determines composition parameter(s) settings and/or identifies composition parameter(s) from communication threads. Indeed, a composition parameter can include a composition style or tone of a user account. For example, the digital electronic communication assistant system 106 determines a composition parameter(s) for a user account as described below (e.g., in relation to FIG. 4).

Moreover, as shown in act 306 of FIG. 3, the digital electronic communication assistant system 106 generates an electronic communication as a response (to the electronic communication thread). For example, the digital electronic communication assistant system 106 can utilize composition parameter(s) and content within an electronic communication thread with a communication generation neural network to generate responsive electronic communications in the electronic communication thread. For instance, the digital electronic communication assistant system 106 can generate an electronic communication utilizing a communication generation neural network as described below (e.g., in relation to FIGS. 5-10).

As mentioned above, the digital electronic communication assistant system 106 can utilize a communication analysis model to determine a composition parameter(s) for a user account. For instance, the digital electronic communication assistant system 106 utilizes user data and/or data corresponding to a user account (e.g., content items) with a communication analysis model to determine composition parameters. Indeed, FIG. 4 illustrates the digital electronic communication assistant system 106 utilizing user data and/or data corresponding to a user account with a communication analysis model to determine one or more composition parameters for the user account.

Figure 4:
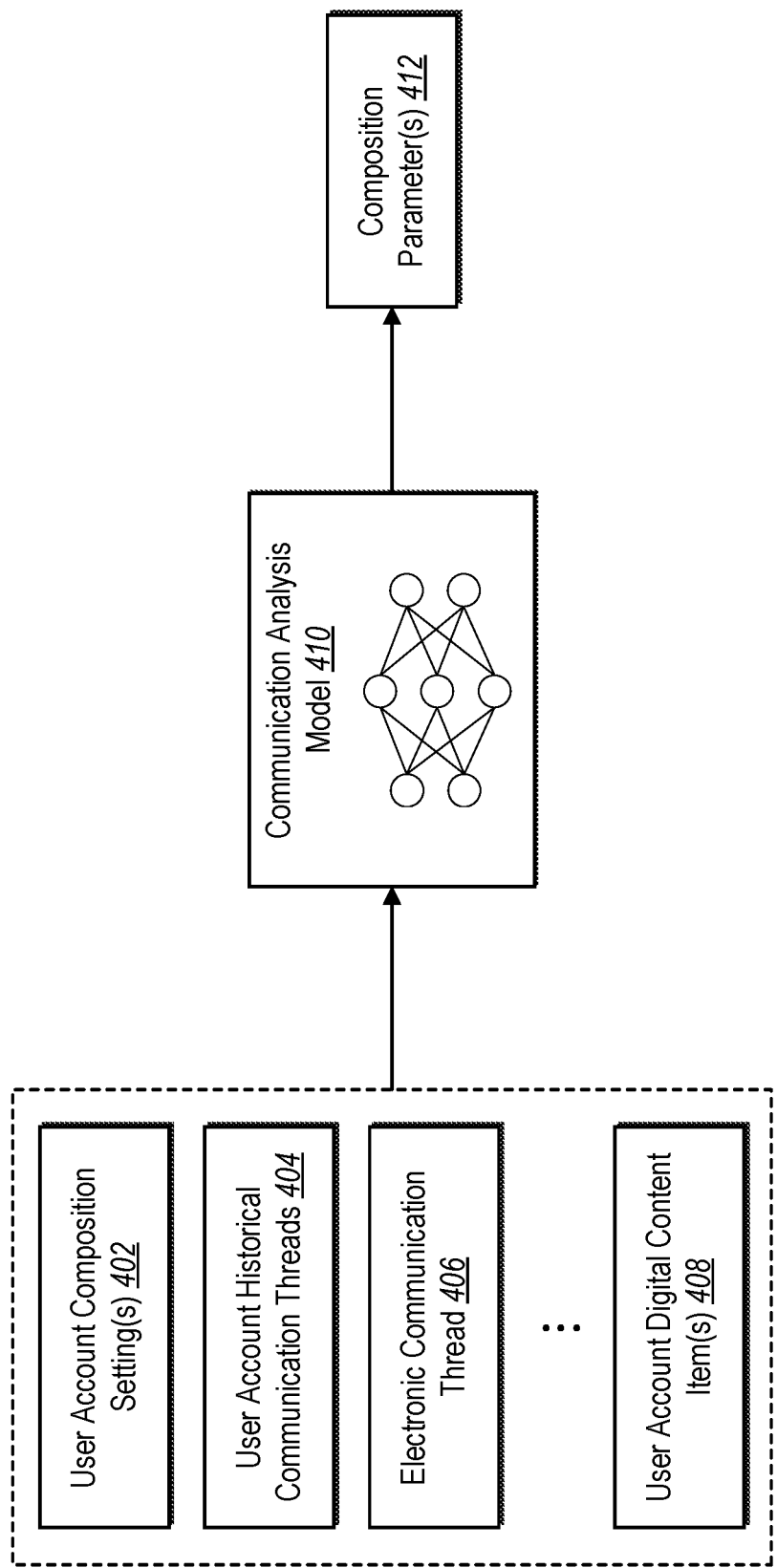
FIG. 4 illustrates a digital electronic communication assistant system determining composition parameters in accordance with one or more implementations.

For example, as shown in FIG. 4, the digital electronic communication assistant system 106 identifies various user data and/or content item data corresponding to a user account. To illustrate, as shown in FIG. 4, the digital electronic communication assistant system 106 identifies user data and/or content item data, such as, user account composition setting(s) 402, user account historical communication threads 404, an electronic communication thread 406, and/or user account digital content item(s) 408. Furthermore, as shown in FIG. 4, the digital electronic communication assistant system 106 utilizes the various data (e.g., user account composition setting(s) 402, user account historical communication threads 404, an electronic communication thread 406, and/or user account digital content item(s) 408) with the communication analysis model 410 to generate (or determine) a composition parameter(s) 412 for the user account.

In some cases, the digital electronic communication assistant system 106 utilizes the user account composition setting(s) 402 with the communication analysis model 410 to determine the composition parameter(s) 412. For example, the digital electronic communication assistant system 106 can receive user selected composition setting preferences that indicate instructions on composition styles, tones, and/or content type to utilize for the composition parameter(s) 412. Indeed, the digital electronic communication assistant system 106 can receive user selections for various combinations of composition styles (e.g., formal, informal, business, casual), composition tones (e.g., friendly, assertive, polite), and/or content types (e.g., long explanation, short explanation, allow hyperlinks, allow attachments, allow adding recipients). Upon receiving the user selections for the various combinations of composition parameters, the digital electronic communication assistant system 106 can use the composition parameters with the communication generation neural network to generate various (current and/or future) electronic communications (reflecting the selected composition parameters) in accordance with one or more embodiments herein.

In some embodiments, the digital electronic communication assistant system 106 utilizes the communication analysis model 410 to analyze an electronic communication thread 406. For example, the digital electronic communication assistant system 106 can analyze the relevant (or current) electronic communication thread for which a response is being generated by the digital electronic communication assistant system 106. In particular, the digital electronic communication assistant system 106 can determine a composition tone and/or style from one or more messages and/or communications within an electronic communication thread and utilize the determined composition tone and/or style as the composition parameter(s) 412.

In one or more embodiments, as shown in FIG. 4, the digital electronic communication assistant system 106 utilizes the communication analysis model 410 to analyze the user account historical communication threads 404 to determine the composition parameter(s) 412. For instance, the digital electronic communication assistant system 106 can analyze various historical electronic communication threads corresponding to the user account. In particular, the digital electronic communication assistant system 106 can determine a composition tone and/or style from one or more messages and/or communications within one or more historical electronic communication threads (e.g., to determine a composition tone and/or style of a user) and utilize the determined composition tone and/or style as the composition parameter(s) 412.

In some implementations, as shown in FIG. 4, the digital electronic communication assistant system 106 utilizes the communication analysis model 410 to analyze the user account digital content item(s) 408 to determine the composition parameter(s) 412. For example, the digital electronic communication assistant system 106 can analyze various content items corresponding to the user account to determine a composition tone and/or style associated with the user account. In particular, the digital electronic communication assistant system 106 can determine a composition tone and/or style from compositions represented within the various content items corresponding to the user account (e.g., to determine a composition tone and/or style of a user) and utilize the determined composition tone and/or style as the composition parameter(s) 412.

Indeed, the digital electronic communication assistant system 106 can utilize various combinations of the user account data (as described above in relation to FIG. 4) with the communication analysis model to determine composition parameter(s) for the user account. Although FIG. 4 illustrates various particular user account data types, the digital electronic communication assistant system 106 can utilize various other user account data to determine composition parameter(s) 412 for a user account. For instance, in some cases, the digital electronic communication assistant system 106 can utilize other user account data, such as, but not limited to, user account activity data and/or feedback data generated from user interactions with generated communication threads (e.g., generated communication thread rejections, transmittals, question-based feedback).

In one or more embodiments, the digital electronic communication assistant system 106 utilizes a classification neural network to determine composition parameter(s) from user data. For instance, the digital electronic communication assistant system 106 utilizes the classification neural network to generate (or predict) composition parameter labels for various data corresponding to the user account. For example, the digital electronic communication assistant system 106 can utilize the classification neural network-based communication analysis model to predict labels (for composition parameters) for various content within user data (e.g., a sentence and/or paragraph in an electronic communication thread and/or a composition in an electronic communication thread).

In some cases, the digital electronic communication assistant system 106 can also utilize natural language processing to determine composition parameters from user data. For instance, the digital electronic communication assistant system 106 can utilize natural language processing (within the communication analysis model) to identify various phrases and/or sentences within user data. Then, the digital electronic communication assistant system 106 can determine a composition style and/or tone (e.g., composition parameter) for the phrases and/or sentences determined by the natural language processing-based communication analysis model.

Additionally, in one or more embodiments, the digital electronic communication assistant system 106 can determine varying composition parameters for varying contacts. In particular, the digital electronic communication assistant system 106 can identify contacts within an electronic communication thread and determine composition parameters for the identified contacts to utilize in a generated electronic communication (in accordance with one or more embodiments herein). For example, the digital electronic communication assistant system 106 can utilize a formal composition style for a first identified contact (e.g., an electronic communication thread with a manager of a user account, a customer of the user account) and can utilize an informal composition style for a second identified contact in another electronic communication thread (e.g., an electronic communication thread with a friend of a user account, a colleague of a user account). In some cases, the digital electronic communication assistant system 106 can utilize third-party applications (e.g., a social media application, a contact list application) to determine a relationship between a user account and an additional user account (or contact) to determine a particular set of composition parameters for a generated electronic communication.

Figure 5:
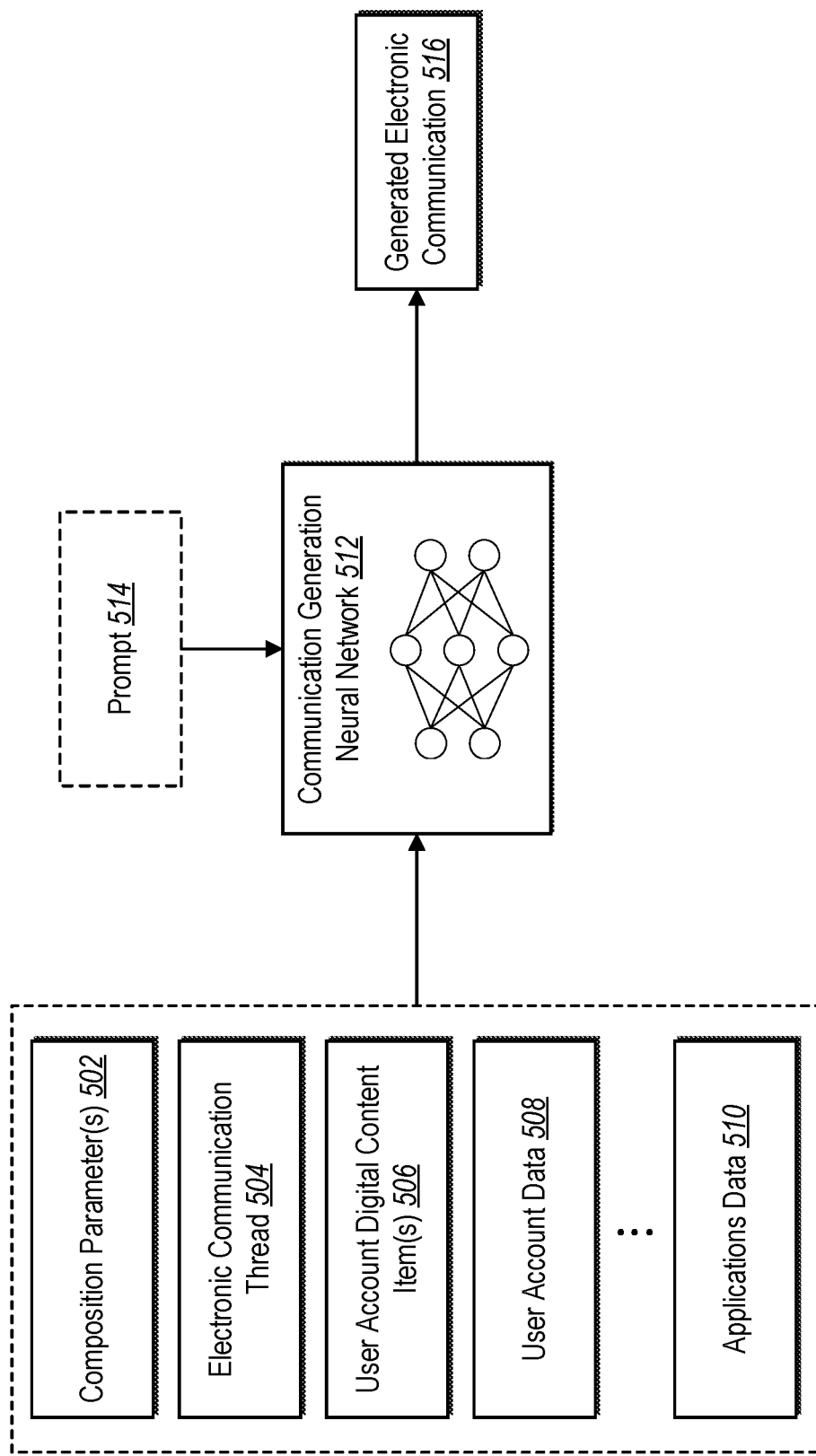
FIG. 5 illustrates a digital electronic communication assistant system utilizing a communication generation neural network to generate an electronic communication in accordance with one or more implementations.

As mentioned above, the digital electronic communication assistant system 106 can utilize a communication generation neural network to generate an electronic communication. For example, FIG. 5 illustrates the digital electronic communication assistant system 106 utilizing a communication generation neural network to generate an electronic communication. In particular, FIG. 5 illustrates the digital electronic communication assistant system 106 utilizing various user data with a communication generation neural network to generate an electronic communication.

Indeed, as shown in FIG. 5, the digital electronic communication assistant system 106 utilizes composition parameter(s) 502 and an electronic communication thread 504 with a communication generation neural network 512 to output (or generate) a generated electronic communication 516 (that is responsive to the electronic communication thread 504). In some cases, the digital electronic communication assistant system 106 utilizes the electronic communication thread 504 as a prompt 514 for the communication generation neural network 512 to generate the generated electronic communication 516. Indeed, the digital electronic communication assistant system 106 utilizes the electronic communication thread 504 as a prompt 514 that is input into the communication generation neural network 512 such that the communication generation neural network 512 generates content and/or a response to the prompt 514 (based on the electronic communication thread 504). Indeed, in some cases, the digital electronic communication assistant system 106 utilizes the prompt 514 as an input prompt for a generative pre-trained transformer model-based communication generation neural network (e.g., a GPT model) to enable the generative pre-trained transformer model-based communication generation neural network to generate a response to the prompt 514.

As an example, the digital electronic communication assistant system 106 identifies one or more messages from an electronic communication thread (e.g., the most current message in a thread, messages that are unread, messages that are not yet responded to). Moreover, the digital electronic communication assistant system 106 can utilize the identified one or more messages as input prompts to a communication generation neural network. Indeed, in one or more embodiments, the digital electronic communication assistant system 106 utilizes the communication generation neural network to generate a response for the input one or more messages (as prompts). For instance, the digital electronic communication assistant system 106 utilizes the communication generation neural network to generate a response to one or more messages that create prompts, such as, but not limited to, questions (e.g., informational requests), scheduling inquiries, instruction and/or direction inquiries, and/or electronic document requests.

Furthermore, as shown in FIG. 5, the digital electronic communication assistant system 106 also utilizes composition parameter(s) 502 with the communication generation neural network 512. In particular, the digital electronic communication assistant system 106 can utilize composition parameter(s) 502 to instruct the communication generation neural network 512 to generate electronic communications that leverage a particular composition tone and/or style as represented by the composition parameter(s) 502 (as described above). For instance, the digital electronic communication assistant system 106 can utilize the composition parameter(s) 502 with the communication generation neural network to mimic a composition style of a user of a user account within a generated electronic communication.

In some cases, as shown in FIG. 5, the digital electronic communication assistant system 106 utilizes various data corresponding to the user account to generate electronic communications that leverage context of a communication and/or mimic a composition style of the user account. For instance, as shown in FIG. 5, the digital electronic communication assistant system 106 can utilize user account digital content item(s) 506 with the communication generation neural network 512. Indeed, in one or more embodiments, the digital electronic communication assistant system 106 utilizes the user account digital content item(s) 506 with the communication generation neural network 512 to enable the communication generation neural network 512 to identify information from the user account digital content item(s) 506 while responding to one or more messages within an electronic communication thread (e.g., questions, scheduling inquiries, instruction and/or direction inquiries, and/or electronic document requests).

For example, the digital electronic communication assistant system 106 can utilize digital content item(s) corresponding to the user account to generate electronic communications in an electronic communication thread that provide context in relation to the digital content item(s) corresponding to the user account. As an example, the digital electronic communication assistant system 106 can identify an electronic document(s) corresponding to a question within the electronic communication thread and utilize the electronic document(s) to generate a response to the question. For instance, the digital electronic communication assistant system 106 can utilize the communication generation neural network to generate an electronic communication that utilizes information from the electronic document(s), attaches the electronic document(s), and/or references information from the electronic document(s)). As an example, the digital electronic communication assistant system 106 can utilize digital content, such as, video conference transcriptions, electronic spreadsheet data, electronic documents, electronic notes (e.g., annotations, highlights, comments in electronic documents), and/or other media content (e.g., videos, images) corresponding to the user account to generate electronic communications in an electronic communication thread that provide context in relation to the digital content item(s).

In some embodiments, the digital electronic communication assistant system 106 utilizes the communication generation neural network with the electronic communication thread to identify one or more digital content items corresponding to a user account to attach to a generated responsive electronic communication. For instance, the digital electronic communication assistant system 106 can utilize the communication generation neural network to generate a response electronic communication with one or more digital content item attachments that address one or more messages in an electronic communication thread. As an example, the digital electronic communication assistant system 106 can utilize the communication generation neural network to attach one or more digital content items to a generated electronic communication as a response to an electronic communication that includes, but is not limited to, a document request, a question, and/or an instruction request to find digital content.

In some instances, as shown in FIG. 5, the digital electronic communication assistant system 106 utilizes user account data 508 with the communication generation neural network 512. For example, the digital electronic communication assistant system 106 can utilize user activity data with the communication generation neural network to generate electronic communications that accurately reflect user activity data. To illustrate, in some cases, the digital electronic communication assistant system 106 utilizes user activity data with the communication generation neural network to generate electronic communications that reflect the user activity data, such as, but not limited to, planning meet ups during determined active hours of the user account, scheduling reply times for the user account during active hours, and/or determining contacts of a user account to include in the electronic communication.

In some embodiments, as shown in FIG. 5, the digital electronic communication assistant system 106 utilizes various application data 510 with the communication generation neural network 512 to generate an electronic communication 516. For example, the digital electronic communication assistant system 106 can access various applications integrated (or connected) with the user account to utilize data from the various applications with the communication generation neural network. Indeed, the digital electronic communication assistant system 106 utilizes the data from the various applications with the communication generation neural network to generate electronic communications that utilizes information and/or context from the one or more applications corresponding to the user account.

As an example, the digital electronic communication assistant system 106 can access an electronic calendar application to determine an availability of a user when generating an electronic communication for the user account (e.g., responding to a meeting invite, responding to an inquiry for free time). As another example, the digital electronic communication assistant system 106 can access application data from video conferencing applications and/or other communication applications with the communication generation neural network to include context from conversations on those applications within the generated electronic communication. In some cases, the digital electronic communication assistant system 106 access application data from work project tracking applications and/or other productivity applications with the communication generation neural network to include context from activity within those applications within the generated electronic communication (e.g., to address scheduling and/or timeline questions for projects, products, and/or product orders within the electronic communication thread).

In some embodiments, the digital electronic communication assistant system 106 utilizes user account digital content items, user account data, and/or application data with the communication generation neural network to generate electronic communications that include user account specific terminology. For instance, the digital electronic communication assistant system 106 can utilize the communication generation neural network to identify various terminology (e.g., abbreviations, jargon) utilized by a user of a user account and/or by other users within the electronic communication thread to generate electronic communications that include the various terminology.

Additionally, in one or more embodiments, the digital electronic communication assistant system 106 utilizes user account digital content items, user account data, and/or application data with the communication generation neural network to personalize a generated electronic communication. For instance, the digital electronic communication assistant system 106 can utilize electronic notes, social media data, and/or other data for a recipient user in an electronic communication thread with the communication generation neural network to personalize the generated electronic communication. As an example, the digital electronic communication assistant system 106 can generate an electronic communication (via the communication generation neural network) that includes various rapport specific to data for a recipient user (e.g., related to sports, hobbies, major events of the recipient, notes on customer requirements).

In one or more embodiments, the digital electronic communication assistant system 106 utilizes a large language model as the communication generation neural network. In particular, the digital electronic communication assistant system 106 can utilize a large language model that analyzes input text (e.g., a prompt) to generate a response to the input text. Indeed, the digital electronic communication assistant system 106 can utilize various large language models, such as, but not limited to pre-trained transformer (GPT) models and/or Bidirectional Encoder Representations from Transformers (BERT) models fine-tuned for natural language processing tasks, such as, but not limited to, question answering and/or text summarization. In some cases, the digital electronic communication assistant system 106 utilizes a GPT model (as the communication generation neural network model), such as, but not limited to, ChatGPT.

Furthermore, in one or more implementations, the digital electronic communication assistant system 106 utilizes a large language model-based communication generation neural network that is fine-tuned utilizing digital content items corresponding to a user account and/or user data (e.g., historical electronic communication threads, application data) to generate electronic communications that include user account data and/or user account content items (in accordance with one or more implementations herein). For example, the digital electronic communication assistant system 106 can utilize user account content items and/or user data (e.g., historical electronic communication threads, application data) to learn and/or adjust parameters of a communication generation neural network to cause the communication generation neural network to generate electronic communications that reflect the information from the user account content items and/or user data (e.g., historical electronic communication threads, application data).

In some instances, the digital electronic communication assistant system 106 further fine tunes (or trains) the communication generation neural network. In particular, the digital electronic communication assistant system 106 can utilize user feedback to generated electronic communications to learn (or adjust) parameters of the communication generation neural network. For example, in some cases, the digital electronic communication assistant system 106 utilizes user feedback (e.g., rejection of generated electronic communications, transmittal of generated electronic communications, and/or modification of generated electronic communications) to learn (or adjust) parameters of the communication generation neural network.

Although FIG. 5 illustrates the digital electronic communication assistant system 106 utilizing various data with the communication generation neural network, the digital electronic communication assistant system 106 utilizes various other data and/or combination of data to fine tune a communication generation neural network to generate electronic communications that reflect context of a communication in relation to a user account and/or composition styles of the user account.

Figure 6:
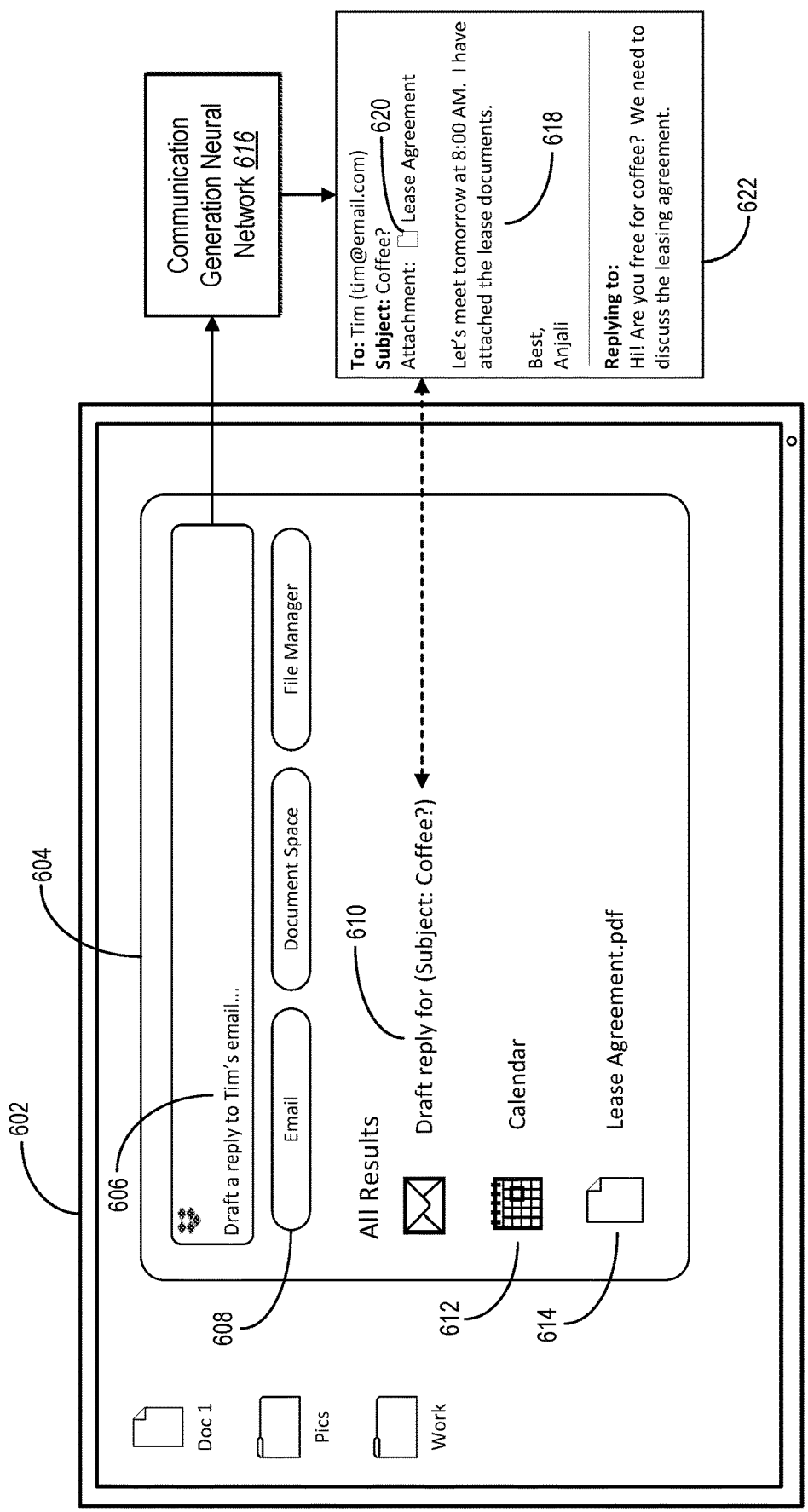
FIG. 6 illustrates a digital electronic communication assistant system integrating a communication generation neural network within a command-driven user interface to surface generated electronic communications in accordance with one or more implementations.

Furthermore, in some cases, the digital electronic communication assistant system 106 integrates a communication generation neural network within a command-driven user interface to generate electronic communications within an electronic communication thread. For instance, FIG. 6 illustrates the digital electronic communication assistant system 106 integrating a communication generation neural network within a command-driven user interface to surface generated electronic communications. In particular, FIG. 6 illustrates the digital electronic communication assistant system 106 generating an electronic communication responsive to an electronic communication thread in response to detecting a user request.

To illustrate, as shown in FIG. 6, the digital electronic communication assistant system 106 provides, for display within a graphical user interface of an operating system on a client device 602, a command-driven user interface 604 implemented to communicate with various applications 608 (e.g., an email application, a document application, a file manager, other SAAS applications). Furthermore, as shown in FIG. 6, the digital electronic communication assistant system 106 receives a user request 606 within the command-driven user interface 604. Utilizing the user request 606 (e.g., draft a reply to Tim's email), the digital electronic communication assistant system 106 utilizes a communication generation neural network 616 to access an electronic communication thread 622 corresponding to the user account operating the command-driven user interface 604 and an additional user account (e.g., Tim's email account) to generate an electronic communication 618 (in accordance with one or more implementations herein). Furthermore, as shown in FIG. 6, the digital electronic communication assistant system 106 also generates, utilizing the communication generation neural network 616, the electronic communication 618 to include an attachment 620 from content items of a user account that corresponds to the context of the electronic communication thread 622 (e.g., a lease agreement document specific to the communicating user accounts due to the discussion of the lease documents). Indeed, the digital electronic communication assistant system 106 surfaces the generated electronic communication via a selectable option 610 within the command-driven user interface 604.

As additionally shown in FIG. 6, the digital electronic communication assistant system 106 also populates the command-driven user interface 604 with one or more relevant content items and/or applications in response to the user request 606. For instance, the digital electronic communication assistant system 106 surfaces a calendar application 612 based on the context of the user request 606 and the content of the electronic communication thread 622. Additionally, the digital electronic communication assistant system 106 also surfaces a content item 614 (e.g., a lease agreement document) that corresponds to the user account based on the context of the user request 606 and the content of the electronic communication thread 622.

Although one or more embodiments herein illustrate the digital electronic communication assistant system 106 receiving a text-based user request (e.g., within the command-drive user interface or other user interface), the digital electronic communication assistant system 106 can also receive a user request via a voice command.

Figure 7:
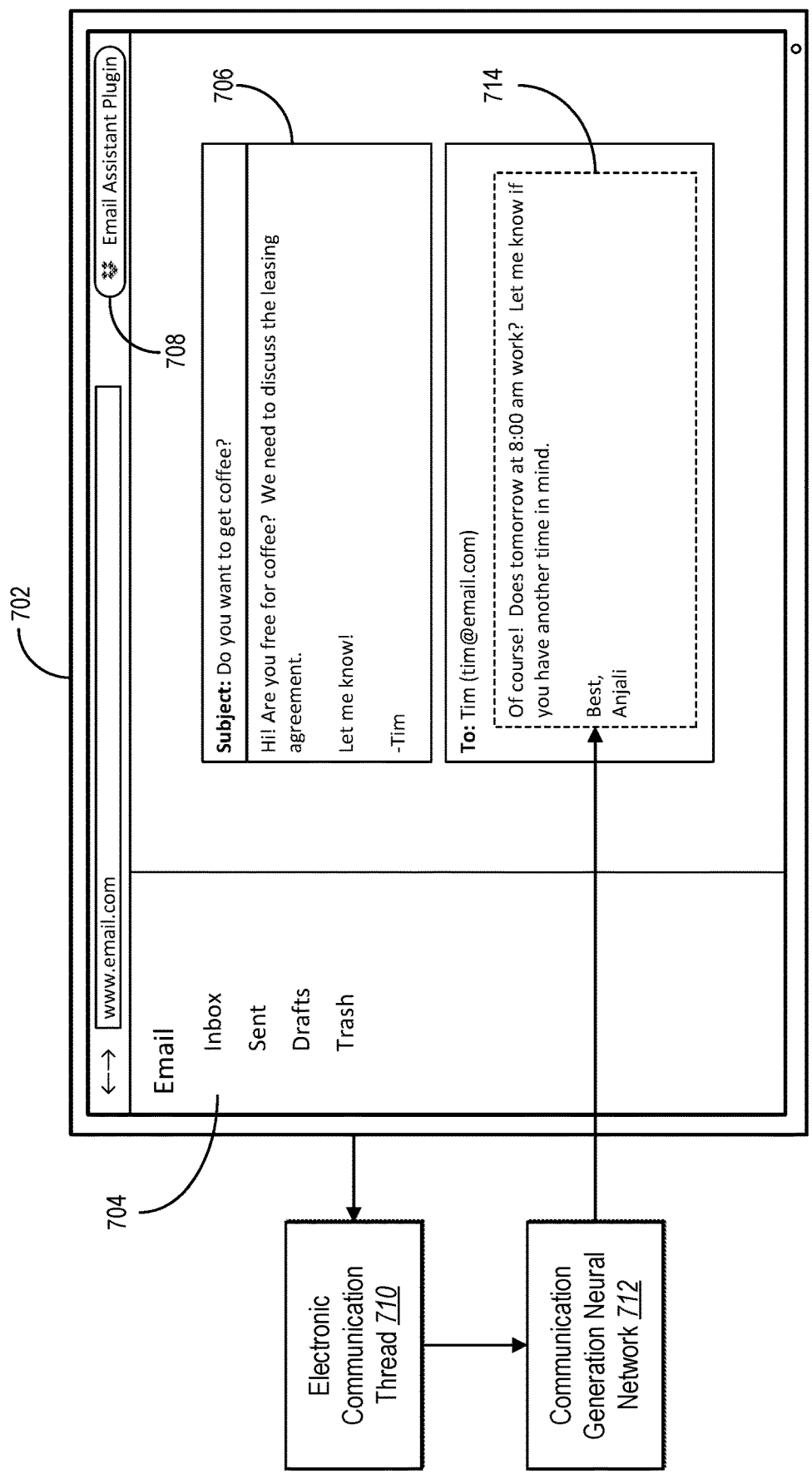
FIG. 7 illustrates a digital electronic communication assistant system receiving a user request to generate an electronic communication within an electronic communication platform via a plugin in accordance with one or more implementations.

In some cases, the digital electronic communication assistant system 106 receives user requests to respond to an electronic communication within an electronic communication platform. For instance, FIG. 7 illustrates the digital electronic communication assistant system 106 receiving a user request to generate an electronic communication within an electronic communication platform via a plugin. Furthermore, FIG. 7 illustrates the digital electronic communication assistant system 106 utilizing the communication generation neural network (via a plugin on the electronic communication platform) to generate an electronic communication responsive to an electronic communication thread (in accordance with one or more implementations herein).

For instance, as shown in FIG. 7, the digital electronic communication assistant system 106 receives a user interaction with an email assistant plugin 708 within an electronic communication platform user interface 704 in a client device 702. Upon receiving the user interaction with the email assistant plugin 708, the digital electronic communication assistant system 106 utilizes the electronic communication thread 710 having the electronic communication 706 with the communication generation neural network 712 to generate an electronic communication 714 (in accordance with one or more implementations herein).

Indeed, in some cases, the digital electronic communication assistant system 106 integrates the communication generation neural network within a plugin on a web browser to interact with one or more electronic communication platforms (e.g., an email website, an instant messaging website, a social media website). Furthermore, in some instances, the digital electronic communication assistant system 106 integrates the communication generation neural network within a plugin and/or an extension on an electronic communication application (e.g., an email application, a mobile instant messaging application).

Furthermore, the digital electronic communication assistant system 106 can integrate the communication generation neural network within a keyboard application (or keyboard plugin). For example, the digital electronic communication assistant system 106 can integrate the communication generation neural network as part of a software-based keyboard (e.g., a mobile device touchscreen keyboard, an electronic keyboard of a laptop). In some cases, the digital electronic communication assistant system 106 causes the software-based keyboard to display a selectable option to utilize the communication generation neural network to generate an electronic communication (within various electronic communication platforms or a text editor of an electronic communication thread). Upon receiving a user interaction with the selectable option within the software-based keyboard, the digital electronic communication assistant system 106 can generate an electronic communication for the electronic communication thread using various context from content corresponding to the user account and/or the electronic communication thread (in accordance with one or more embodiments herein).

Figure 8:
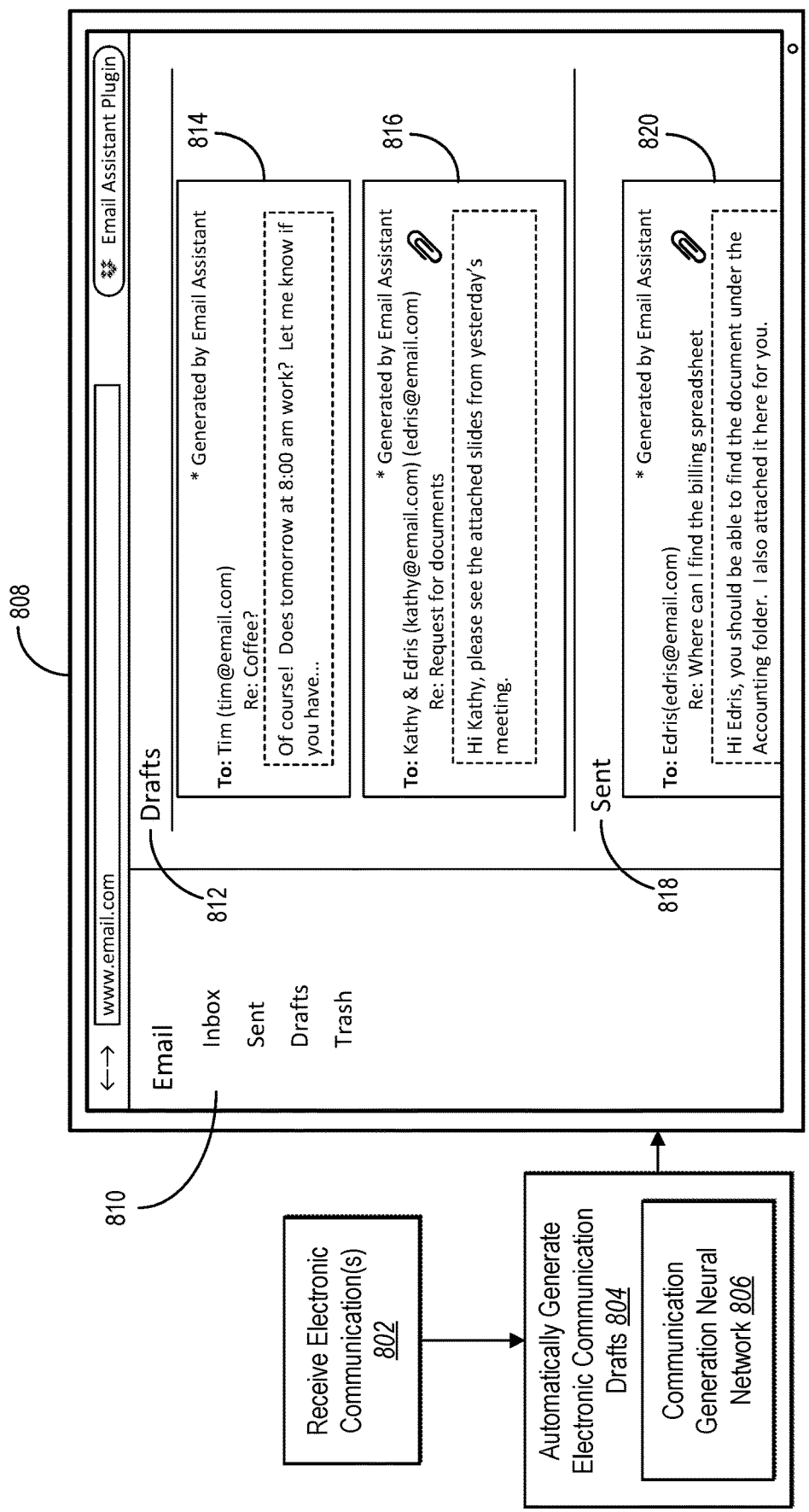
FIG. 8 illustrates a digital electronic communication assistant system displaying, within a graphical user interface, one or more automatically generated draft electronic communications in accordance with one or more implementations.

As mentioned above, in one or more embodiments, the digital electronic communication assistant system 106 generates electronic communications for a user account and saves the electronic communications as drafts on the user account. For example, FIG. 8 illustrates the digital electronic communication assistant system 106 displaying, within a graphical user interface, one or more automatically generated draft electronic communications. Furthermore, FIG. 8 also illustrates the digital electronic communication assistant system 106 displaying, within a graphical user interface, automatically transmitted electronic communications (generated in accordance with one or more implementations herein).

For example, as shown in FIG. 8, the digital electronic communication assistant system 106 receives one or more electronic communication(s) 802. Subsequently, as shown in act 804 of FIG. 8, the digital electronic communication assistant system 106 automatically generates electronic communication drafts utilizing a communication generation neural network 806 (in accordance with one or more implementations herein). Moreover, as shown in FIG. 8, the digital electronic communication assistant system 106 provides, for display within an electronic communication platform user interface 810 in a client device 808, generated draft electronic communications 812.

Indeed, as shown in FIG. 8, the digital electronic communication assistant system 106 displays a generated draft electronic communication 814 (e.g., responding to a request for a meetup) in accordance with one or more embodiments herein. In addition, the digital electronic communication assistant system 106 also displays a generated draft electronic communication 816 (e.g., responding to document request with an attached content item) in accordance with one or more embodiments herein. Although FIG. 8 illustrates the digital electronic communication assistant system 106 displaying a certain number of saved electronic communication drafts, the digital electronic communication assistant system 106 can generate various numbers of draft electronic communications in accordance with one or more embodiments herein.

In addition, as shown in FIG. 8, the digital electronic communication assistant system 106 provides, for display within the electronic communication platform user interface 810 in the client device 808, transmitted draft electronic communications 818. In particular, in some cases, the digital electronic communication assistant system 106 automatically generates and sends electronic communications to recipient user accounts (in accordance with one or more embodiments herein). For instance, as shown in FIG. 8, displays a sent draft electronic communication 820 (e.g., responding to request for instructions on finding a document with an attached content item) in accordance with one or more embodiments herein. Although FIG. 8 illustrates the digital electronic communication assistant system 106 displaying a certain number of sent electronic communication drafts, the digital electronic communication assistant system 106 can generate and send various numbers of draft electronic communications in accordance with one or more embodiments herein.

In some embodiments, the digital electronic communication assistant system 106 determines whether to send a generated draft electronic communication or save the generated draft electronic communication for review. In particular, the digital electronic communication assistant system 106 can determine, for the electronic communication thread, whether an auto reply is permitted. For instance, in some cases, the digital electronic communication assistant system 106 identifies a list of contacts that are flagged to receive auto replies from the digital electronic communication assistant system 106. In some implementations, the digital electronic communication assistant system 106 identifies one or more rule-based options from user account settings to determine electronic communication threads to flag to receive auto replies. For example, in some cases, the digital electronic communication assistant system 106 identifies a rule-based option that indicates flagging various electronic communication threads having specific keywords (e.g., "coffee," "team meeting document requests") as candidates for auto replies. Upon identifying an electronic communication thread flagged for auto replies, the digital electronic communication assistant system 106 can generate electronic communications for the electronic communication thread and automatically transmit the generated electronic communications.

Although FIG. 8 illustrates the digital electronic communication assistant system 106 displaying both generated draft electronic communications and sent generated electronic communications, the digital electronic communication assistant system 106 can display the generated draft electronic communications and sent generated electronic communications singly (or in separate graphical user interfaces).

In some embodiments, the digital electronic communication assistant system 106 provides, for display within a graphical user interface, a notification tray interface with one or more automatically generated electronic communications (using the communication generation neural network as described herein) for user review. In particular, in some cases, the digital electronic communication assistant system 106 displays a notification tray interface with a notification display element that represents a generated draft electronic communication with selectable options to interact with the electronic communication. For instance, the digital electronic communication assistant system 106 can display selectable options to modify, send, and/or reject a generated draft electronic communication.

Figure 9:
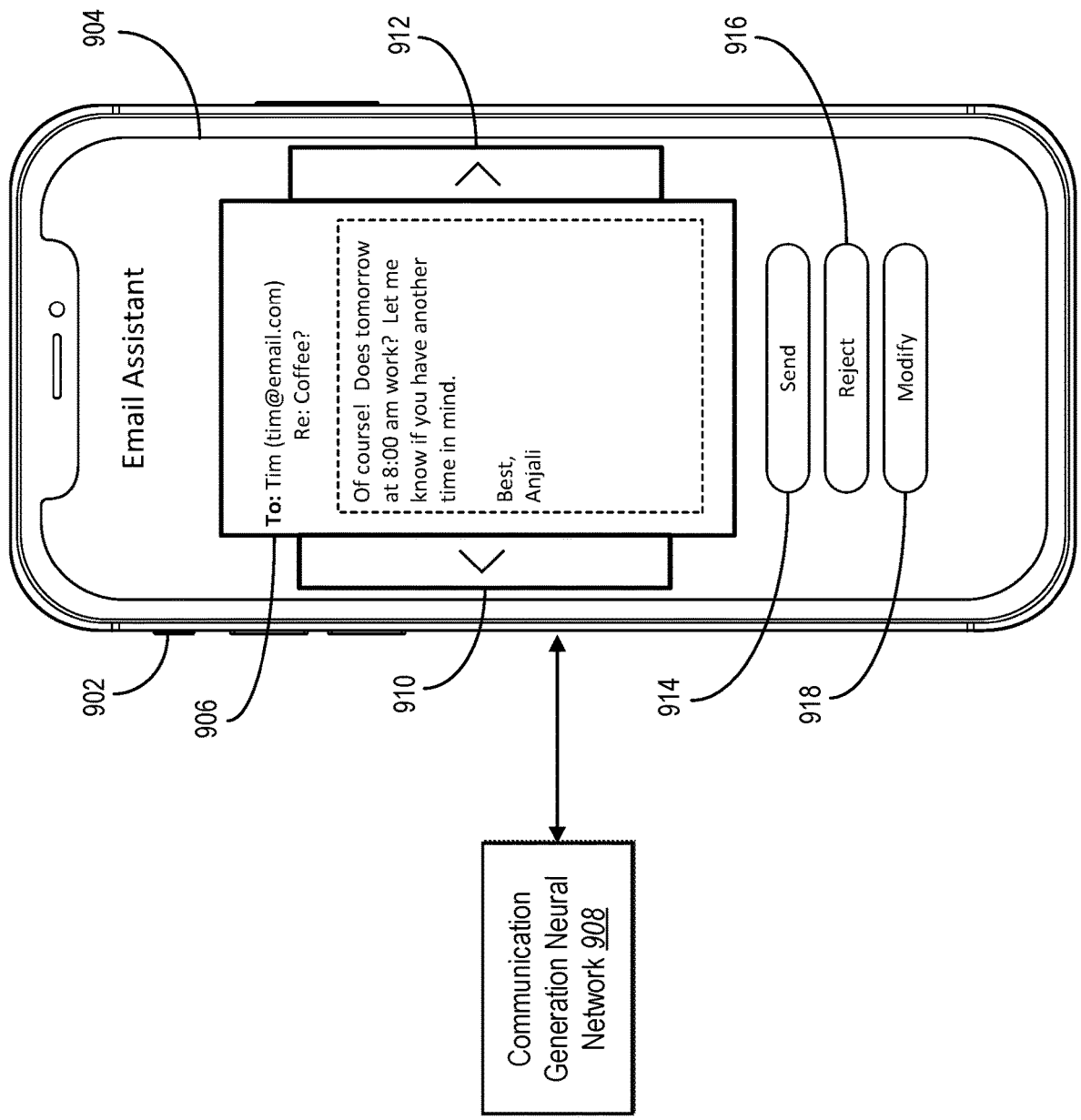
FIG. 9 illustrates a digital electronic communication assistant system displaying a notification tray interface with one or more automatically generated electronic communications in accordance with one or more implementations.

For example, FIG. 9 illustrates the digital electronic communication assistant system 106 displaying a notification tray interface with one or more automatically generated electronic communications (using the communication generation neural network as described herein) for user review. As shown in FIG. 9, the digital electronic communication assistant system 106 provides, for display within a graphical user interface 904 of a client device 902, a notification display element 906 having a displayed representation of a generated draft electronic communication (generated using a communication generation neural network 908). In addition, as shown in the FIG. 9, the digital electronic communication assistant system 106 also displays, within the notification display element 906, selectable options 914-918 for the generated draft electronic communication.

Indeed, as shown in FIG. 9, the digital electronic communication assistant system 106 displays the selectable option 914 that (upon user selection) enables a transmission of the generated draft electronic communication displayed within the notification display element 906. Additionally, as shown in FIG. 9, the digital electronic communication assistant system 106 displays the selectable option 916 that (upon user selection) rejects (or deletes) the generated draft electronic communication displayed within the notification display element 906. Moreover, as shown in FIG. 9, the digital electronic communication assistant system 106 displays the selectable option 918 that (upon user selection) enables modification of the generated draft electronic communication displayed within the notification display element 906 (e.g., in accordance with one or more embodiments herein).

Furthermore, the digital electronic communication assistant system 106 also displays selectable elements to navigate between multiple generated draft electronic communications. For example, as shown in FIG. 9, the digital electronic communication assistant system 106 displays selectable options 910, 912 to, upon user selection, navigate between various notification display elements that represent different generated draft electronic communications (generated in accordance with one or more embodiments herein). Indeed, in one or more instances, the selectable options 910, 912 enable navigation between next and/or previous generated draft electronic communications.

Although, FIG. 9 illustrates the digital electronic communication assistant system 106 displaying a particular notification tray interface with a particular notification display element, the digital electronic communication assistant system 106 can display various graphical user elements to present and/or enable navigation between various generated draft electronic communications and/or selectable options for the generated draft electronic communications. For example, the digital electronic communication assistant system 106 can display a popup notification to present and/or enable navigation between various generated draft electronic communications and/or selectable options for the generated draft electronic communications. In some instances, the digital electronic communication assistant system 106 can display a swipeable user interface present and/or enable navigation between various generated draft electronic communications and/or selectable options for the generated draft electronic communications. In some embodiments, the digital electronic communication assistant system 106 provides audible notifications (e.g., audio-based notifications) with one or more voice command options to present and/or enable navigation between various generated draft electronic communications and/or selectable options for the generated draft electronic communications.

In some embodiments, the digital electronic communication assistant system 106 orders the automatically generated electronic communications (using the communication generation neural network as described herein) for user review in the notification tray interface. For instance, the digital electronic communication assistant system 106 can utilize user data (e.g., historical electronic communication threads, shared content items and/or folders within a content management system with one or more other user accounts, user account contact information from user accounts corresponding to the shared folders in the content management system, user account role type, such as, managers, customers, and/or interns) to determine a priority ranking for the automatically generated electronic communications in the notification tray interface. Indeed, the digital electronic communication assistant system 106 can determine a priority ranking and reorder the automatically generated electronic communications in the notification tray interface to reflect the priority ranking (e.g., display high priority tasks or saved electronic communications before low priority saved electronic communications).

Furthermore, although one or more implementations illustrate the digital electronic communication assistant system 106 utilizing the communication generation neural network to generate an electronic communication responsive to an electronic communication thread, the digital electronic communication assistant system 106 can automatically generate (or initiate) an electronic communication thread. For instance, the digital electronic communication assistant system 106 can receive a request (from a user of a client device through a plugin, within a command-driven user interface, and/or through a keyboard application (as describe above) to generate a new electronic communication. Then, the digital electronic communication assistant system 106 can utilize the request (as a prompt) with the communication generation neural network to generate a new electronic communication. For example, the digital electronic communication assistant system 106 can receive a prompt from a user, such as, but not limited to, "send an email to Tim to meet for coffee," "send an email to Yuki with the final project document," "send a message to Katie with the final sales information." Indeed, the digital electronic communication assistant system 106 can utilize the requests as prompts for the communication generation neural network that leverages content items associated with the requesting user account and/or composition parameters from the user account to generate electronic communications (in accordance with one or more embodiments herein) in response to the requests.

In one or more embodiments, the digital electronic communication assistant system 106 can utilize detected tasks from video conference transcripts and/or electronic communication threads to generate automatically electronic communications. For instance, the digital electronic communication assistant system 106 can identify one or more tasks from conversations in video conference transcripts and/or electronic communication threads, such as, but not limited to, "follow up with Anjali for the lease agreement documents," "send Tim today's spreadsheets," "follow up with Roger for the seating arrangement." Subsequently, the digital electronic communication assistant system 106 can identify a corresponding contact and method of contact (e.g., email, instant messaging, text messaging) for the contact from the detected task using user data (e.g., historical electronic communication threads, shared content items and/or folders within a content management system with one or more other user accounts, user account contact information from user accounts corresponding to the shared folders in the content management system). Moreover, the digital electronic communication assistant system 106 can utilize the detected task as a prompt for the communication generation neural network to generate an electronic communication in accordance with one or more embodiments herein (for the identified contact).

In one or more implementations, the digital electronic communication assistant system 106 identifies contacts for a generated electronic communication using user data. For instance, the digital electronic communication assistant system 106 can utilize detected names and/or content item titles to determine a contact for a particular task. For instance, upon detecting (within conversations in video conference transcripts and/or electronic communication threads) a project name, the digital electronic communication assistant system 106 can identify contacts and/or digital content items corresponding to the project name within the content management system for the user account (e.g., using shared content items, digital calendar invites and/or meetings, historical electronic communication threads related to the project name). Then, the digital electronic communication assistant system 106 can utilize the identified contacts and/or digital content items with the communication generation neural network to generate an electronic communication (in accordance with one or more implementations herein).

In some instances, the digital electronic communication assistant system 106 receives a user prompt to modify an electronic communication generated in accordance with one or more embodiments herein. In one or more embodiments, the digital electronic communication assistant system 106 modifies a generated electronic communication in response to the request to modify the electronic communication. For example, FIG. 10 illustrates the digital electronic communication assistant system 106 receiving a request to modify a generated electronic communication and, in response, modifying the electronic communication.

Figure 10:
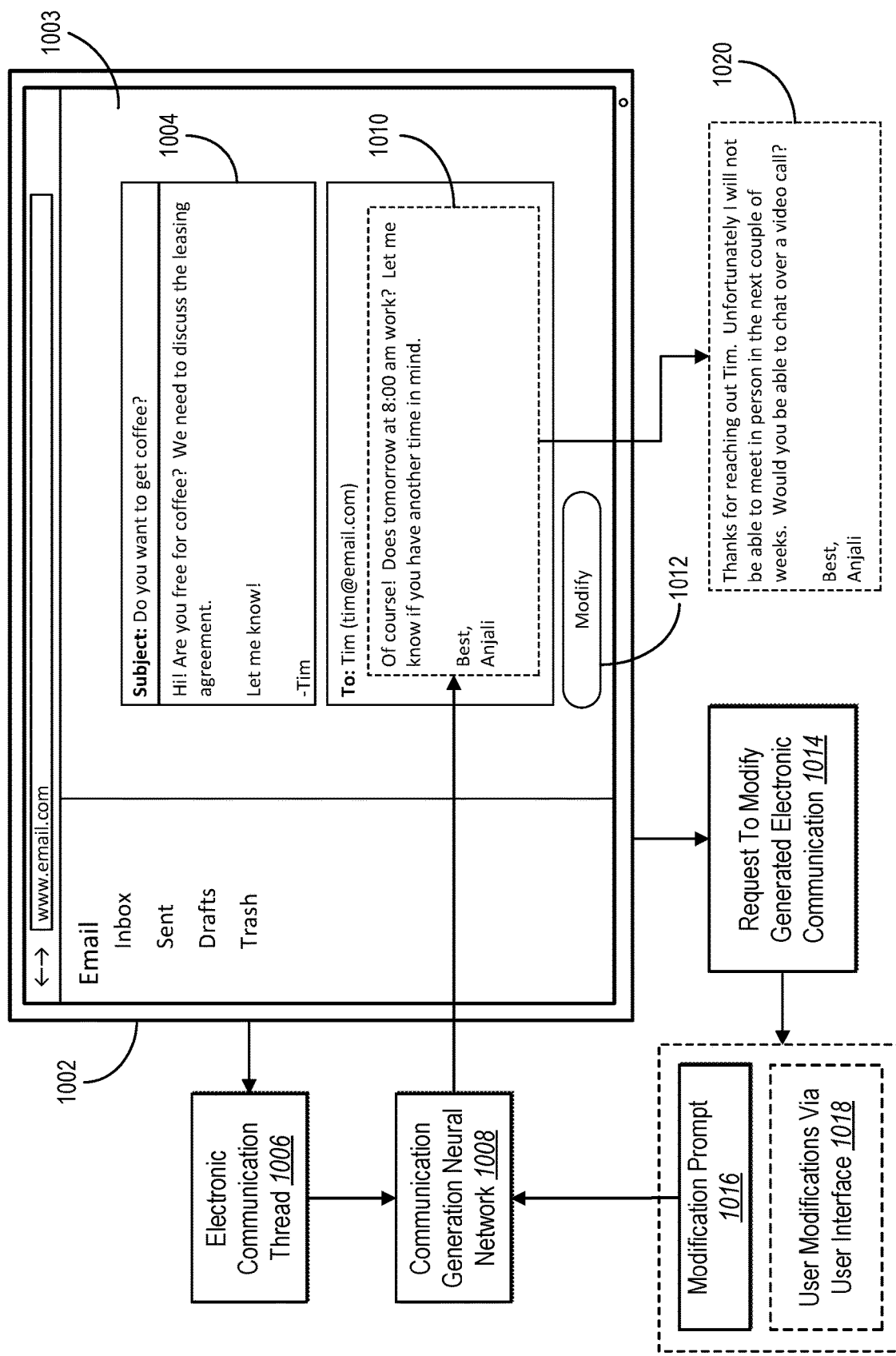
FIG. 10 illustrates a digital electronic communication assistant system receiving a request to modify a generated electronic communication in accordance with one or more implementations.

For example, as shown in FIG. 10, the digital electronic communication assistant system 106 displays (or presents), within a graphical user interface 1003 of a client device 1002, an electronic communication thread 1006 having an electronic communication 1004 and a generated response electronic communication 1010 (e.g., generated using a communication generation neural network 1008 in accordance with one or more embodiments herein). Furthermore, as shown in FIG. 10, the digital electronic communication assistant system 106 displays a selectable option 1012 to modify the generated response electronic communication 1010.

Upon receiving, in an act 1014, a user selection of the selectable option 1012 for a request to modify the generated electronic communication (e.g., a user prompt to modify the generated response electronic communication 1010), the digital electronic communication assistant system 106 receives a modification prompt 1016 from the client device 1002. In addition, as shown in the FIG. 10, the digital electronic communication assistant system 106 utilizes the modification prompt 1016 with the communication generation neural network 1008 to modify the generated response electronic message 1010 to a modified generated response electronic communication 1020.

In some embodiments, the modification prompt 1016 includes a prompt for the communication generation neural network 1008. In particular, the digital electronic communication assistant system 106 can receive a text-based and/or voice command-based modification prompt 1016 that represents instructions to the communication generation neural network 1008 to generate a (modified) electronic communication. Indeed, the digital electronic communication assistant system 106 utilizes the modification prompt 1016 with the communication generation neural network 1008 to modify the existing generated electronic communication 1010. In some instances, the digital electronic communication assistant system 106 utilizes the modification prompt 1016 with the communication generation neural network 1008 to generate a new electronic communication that reflects the modification prompt 1016 while also utilizing the electronic communication thread 1006 and/or user account content items (in accordance with one or more embodiments herein).

As an example, the digital electronic communication assistant system 106 can receive and utilize modification prompts that represent instructions to modify wording of an electronic communication, composition style of an electronic communication, and/or a tone of the electronic communication (e.g., composition parameters). For instance, the digital electronic communication assistant system 106 can receive and utilize a modification prompt, such as, but not limited to, "make the email more polite," "make the email more formal," "decline the invitation politely," "use simpler vocabulary," "do not mention my other appointments," and/or "make the message more informal." Indeed, the digital electronic communication assistant system 106 can utilize various modification prompts with the communication generation neural network to modify the composition styling, tone, and/or content of a generated electronic message.

In one or more embodiments, the digital electronic communication assistant system 106 receives a request to modify a generated electronic communication via a modification user interface. For instance, as shown in FIG. 10, the digital electronic communication assistant system 106 can receive user modifications via a user interface in an act 1018. Indeed, the digital electronic communication assistant system 106 can display a user interface with an electronic communication editor to receive one or more modifications to the electronic communication via user interaction with the electronic communication. In some instances, the digital electronic communication assistant system 106 utilizes an electronic communication editor (e.g., an email editor, a document editor) to enable user interactions with the generated electronic communication to modify the electronic communication. For example, the digital electronic communication assistant system 106 can receive user interactions with an electronic communication editor to modify text of the electronic communication, recipients of the electronic communication, and/or attachments of the electronic communication.

Figure 11:
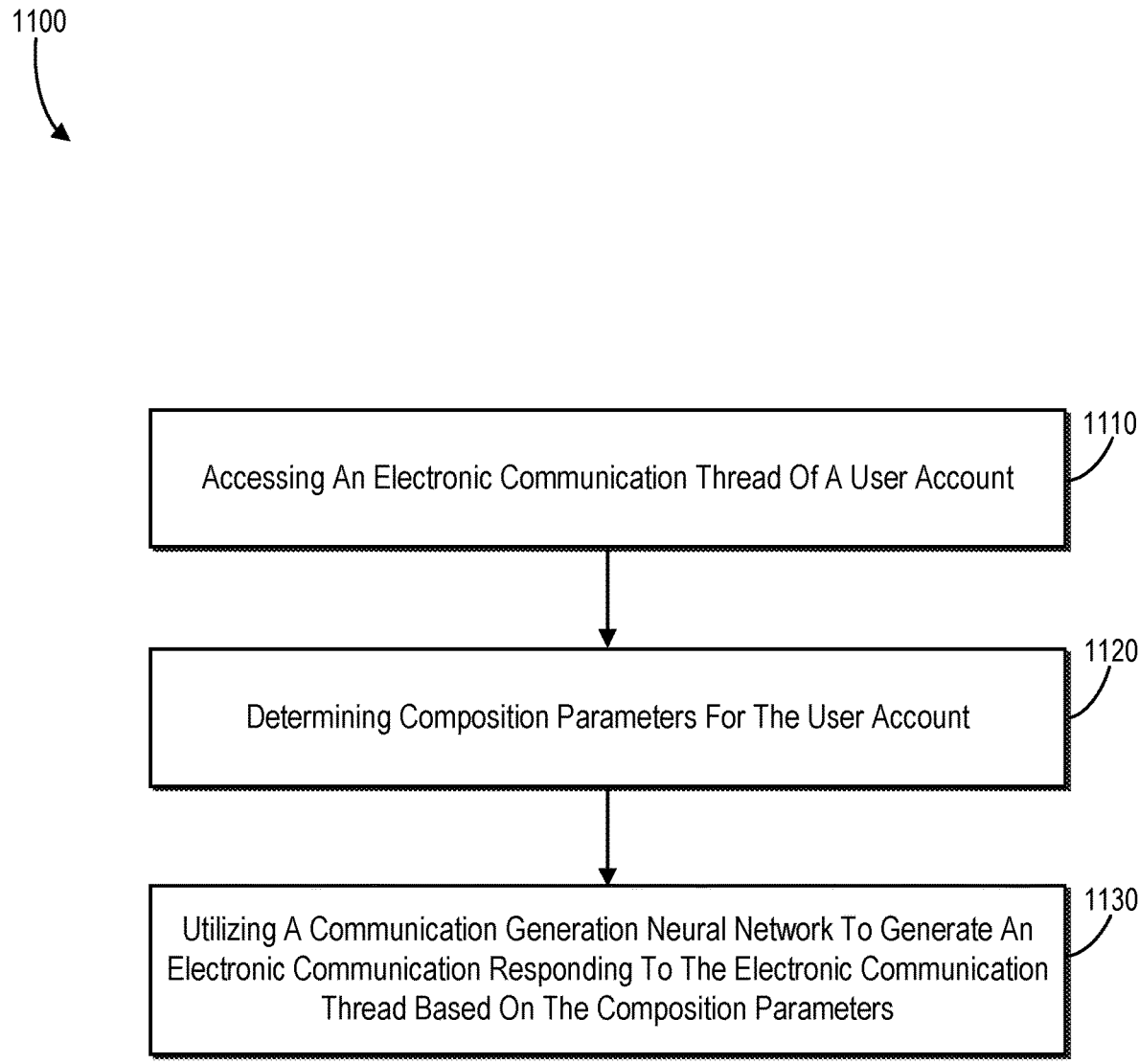
FIG. 11 illustrates a flowchart of series of acts for utilizing a communication generation neural network, fine-tuned to data corresponding to a user account, to intelligently and automatically generate electronic communications for the user account in accordance with one or more implementations.

FIGS. 1-10, the corresponding text, and the examples provide a number of different methods, systems, devices, and non-transitory computer-readable media of the digital electronic communication assistant system 106. In addition to the foregoing, one or more implementations can also be described in terms of flowcharts comprising acts for accomplishing a particular result, as shown in FIG. 11. The acts shown in FIG. 11 may be performed in connection with more or fewer acts. Furthermore, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 11. In some implementations, a system can be configured to perform the acts of FIG. 11. Alternatively, the acts of FIG. 11 can be performed as part of a computer-implemented method.

FIG. 11 illustrates a flowchart of series of acts 1100 for utilizing a communication generation neural network, fine-tuned to data corresponding to a user account, to intelligently and automatically generate electronic communications for the user account in accordance with one or more implementations herein. While FIG. 11 illustrates acts according to one implementation, alternative implementations may omit, add to, reorder, and/or modify any of the acts shown in FIG. 11.

As shown in FIG. 11, the series of acts 1100 include an act 1110 of accessing an electronic communication thread of a user account, an act 1120 of determining composition parameters for the user account, an act 1130 of utilizing a communication generation neural network to generate an electronic communication responding to the electronic communication thread based on the composition parameters.

In some embodiments, the act 1110 can include accessing an electronic communication thread of a user account, the electronic communication thread comprising one or more electronic communications between the user account and an additional user account, the act 1120 can include determining one or more composition parameters for generating electronic communications for the user account, and the act 1130 can include generating, utilizing a communication generation neural network with the one or more composition parameters and the electronic communication thread, an electronic communication to include within the electronic communication thread as a response to the additional user account.

In some cases, the act 1110 includes accessing an electronic communication thread of a user account, the electronic communication thread comprising one or more electronic communications between the user account and an additional user account, the act 1120 includes determining one or more composition parameters for generating electronic communications to include within the electronic communication thread by utilizing a communication analysis model to analyze the one or more electronic communications of the electronic communication thread, and the act 1130 includes generating, based on the one or more composition parameters, an electronic communication to include within the electronic communication thread utilizing a communication generation neural network.

For instance, a communication generation neural network can include a large language model.

Furthermore, the act 1110 can include accessing an electronic communication thread of a user account, the electronic communication thread comprising one or more electronic communications between the user account and an additional user account, the act 1120 can include determining one or more composition parameters for generating electronic communications for the user account, and the act 1130 can include identifying one or more digital content items corresponding to the user account from a content management system and generating, based on the one or more composition parameters, the one or more digital content items, and the electronic communication thread, an electronic communication to include within the electronic communication thread utilizing a communication generation neural network.

In some implementations, the series of acts 1100 include determining the one or more composition parameters by utilizing a communication analysis model to analyze the one or more electronic communications of the electronic communication thread to identify a tone or composition style of the one or more electronic communications. In some cases, the series of acts 1100 include determining the one or more composition parameters from user account settings corresponding to the user account.

Moreover, the series of acts 1100 can include generating the electronic communication utilizing the communication generation neural network based on one or more content items corresponding to the user account from a content management system (wherein the one or more content items comprise digital files, video conference transcriptions, or historical electronic communication threads).

Additionally, the series of acts 1100 can include receiving a user request to respond to the electronic communication thread within an assistance application comprising the communication generation neural network and the one or more composition parameters. In addition, the series of acts 1100 can include, in response to the user request, causing the assistance application to access the electronic communication thread and generate, utilizing the communication generation neural network, the electronic communication to include within the electronic communication thread.

Furthermore, the series of acts 1100 can include receiving, via an assistance application, a user request to respond to the electronic communication thread within an electronic communication platform, wherein the electronic communication platform comprises a website or an electronic communication application and the assistance application comprises a browser plugin, an application plugin, or a mobile device keyboard application. Additionally, the series of acts 1100 can include, in response to the user request, causing the assistance application to access the electronic communication thread and generate, utilizing the communication generation neural network, the electronic communication to include within the electronic communication thread.

Moreover, the series of acts 1100 can include automatically accessing the electronic communication thread of the user account. In addition, the series of acts 1100 can include automatically generating, utilizing the communication generation neural network, the electronic communication as a draft electronic communication saved for the user account. In addition, the series of acts 1100 can include, upon receiving a user interaction requesting to view the draft electronic communication, providing, for display within a client device corresponding to the user account, an editing user interface comprising the generated draft electronic communication, receiving one or more modifications to the draft electronic communication, and/or transmitting the modified draft electronic communication to the additional user account. Furthermore, the series of acts 1100 can include displaying within a notification tray interface, a notification display element comprising a representation of the generated draft electronic communication with selectable options to transmit the generated draft electronic communication, modify the generated draft electronic communication, or reject the generated draft electronic communication, wherein the notification tray interface comprises one or more notification display elements for one or more draft electronic communications. In addition, the series of acts 1100 can include automatically transmitting the electronic communication to the additional user account within the electronic communication thread.

Furthermore, the series of acts 1100 can include receiving a user prompt from a user interaction to modify the generated electronic communication and utilizing the user prompt with the communication generation neural network to generate a modified electronic communication.

In some cases, the series of acts 1100 can include identifying, utilizing the communication generation neural network, a digital content item corresponding to the user account based on the one or more composition parameters, the one or more digital content items, or the electronic communication thread and automatically attaching the identified digital content item to the generated electronic communication.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
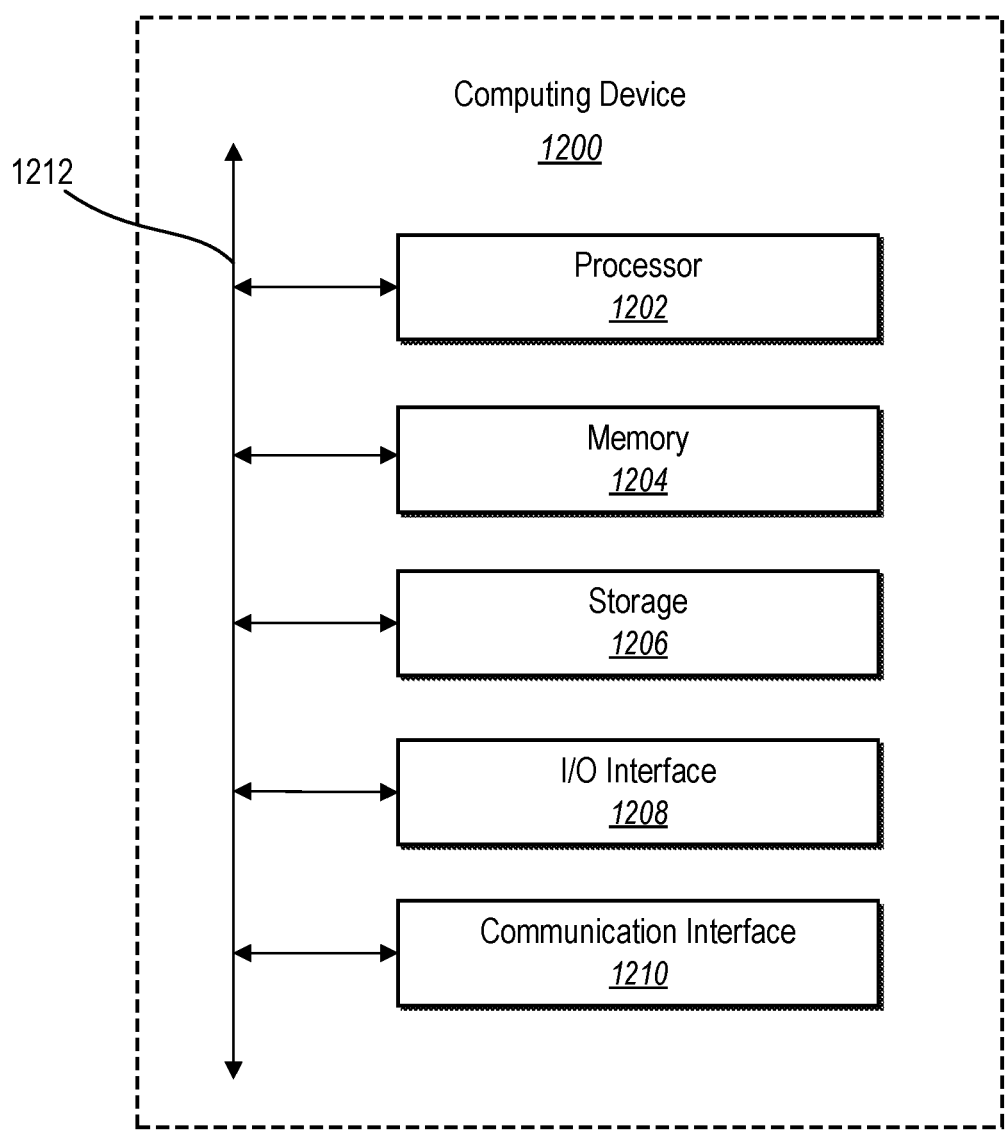
FIG. 12 illustrates a block diagram of an exemplary computing device in accordance with one or more implementations.

FIG. 12 illustrates a block diagram of exemplary computing device 1200 that may be configured to perform one or more of the processes described above. One will appreciate that server device(s) 102 and/or the client device 110 may comprise one or more computing devices, such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
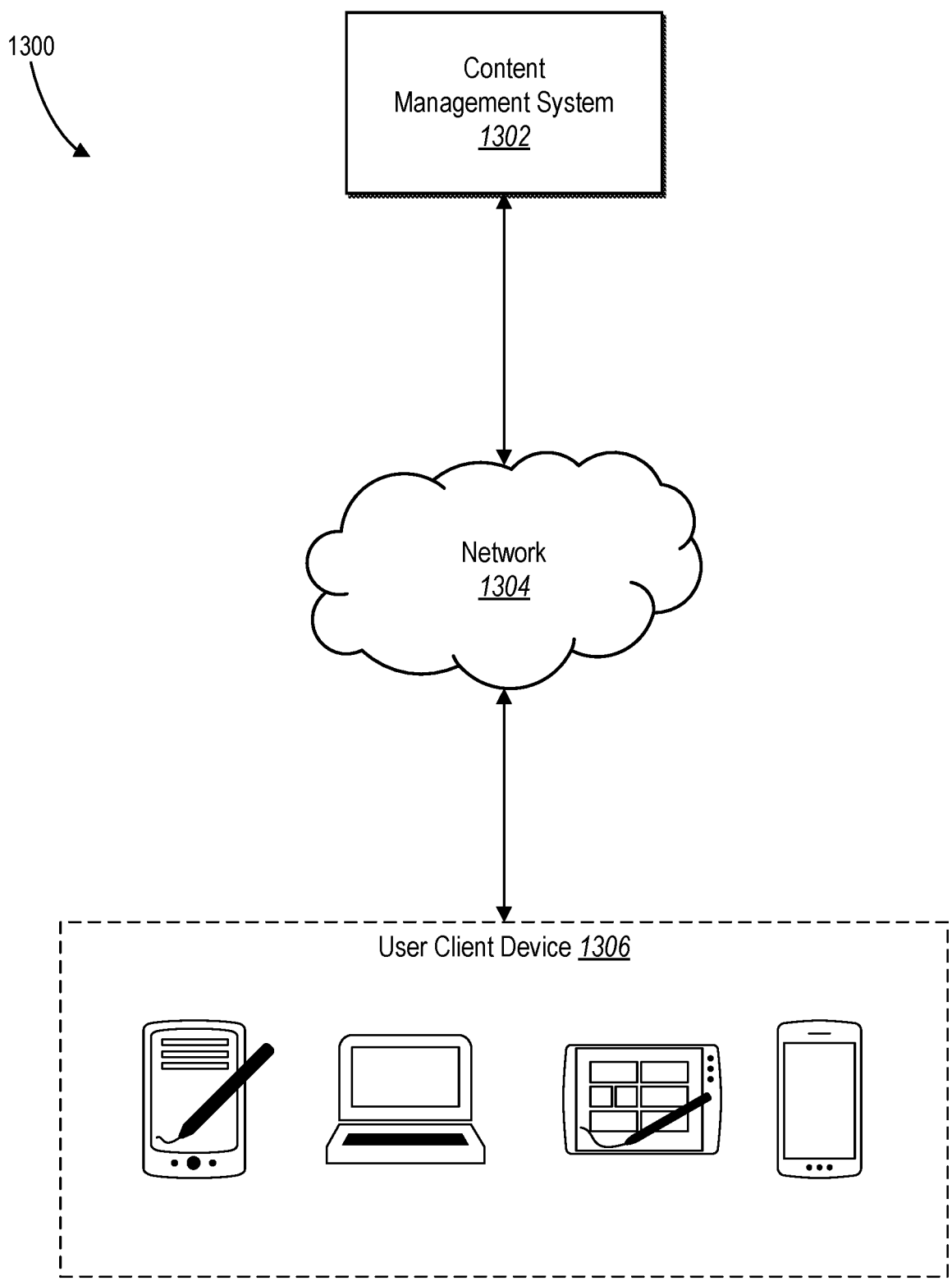
FIG. 13 illustrates an example environment of a networking system in accordance with one or more implementations.

FIG. 13 is a schematic diagram illustrating environment 1300 within which one or more embodiments of content management system 104 can be implemented. Content management system 1302 may generate, store, manage, receive, and send digital content (such as digital images and videos). For example, content management system 1302 may send and receive digital content to and from client devices 1306 by way of network 1304. In particular, content management system 1302 can store and manage a collection of digital content. Content management system 1302 can manage the sharing of digital content between computing devices associated with a plurality of users. For instance, content management system 1302 can facilitate a user sharing a digital content with another user of content management system 1302.

In particular, content management system 1302 can manage synchronizing digital content across multiple client devices 1306 associated with one or more users. For example, a user may edit digital content using client device 1306. The content management system 1302 can cause client device 1306 to send the edited digital content to content management system 1302. Content management system 1302 then synchronizes the edited digital content on one or more additional computing devices.

In addition to synchronizing digital content across multiple devices, one or more embodiments of content management system 1302 can provide an efficient storage option for users that have large collections of digital content. For example, content management system 1302 can store a collection of digital content on content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from content management system 1302. In particular, upon a user selecting a reduced-sized version of digital content, client device 1306 sends a request to content management system 1302 requesting the digital content associated with the reduced-sized version of the digital content. Content management system 1302 can respond to the request by sending the digital content to client device 1306. Client device 1306, upon receiving the digital content, can then present the digital content to the user. In this way, a user can have access to large collections of digital content while minimizing the number of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox for iPhone or iPad, Dropbox for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access content management system 1302.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   accessing an electronic communication thread of a user account, the electronic communication thread comprising one or more electronic communications between the user account and an additional user account;
   determining one or more composition parameters for generating electronic communications to include within the electronic communication thread by utilizing a communication analysis model to analyze the one or more electronic communications of the electronic communication thread;
   generating, based on the one or more composition parameters, an electronic communication to include within the electronic communication thread utilizing a communication generation neural network;
   receiving a user prompt from a user interaction to modify the generated electronic communication; and
   utilizing the user prompt with the communication generation neural network to generate a modified electronic communication.

2. The computer-implemented method of claim 1, further comprising determining the one or more composition parameters by utilizing the communication analysis model to analyze the one or more electronic communications of the electronic communication thread to identify a tone or composition style of the one or more electronic communications.

3. The computer-implemented method of claim 1, further comprising determining the one or more composition parameters from user account settings corresponding to the user account.

4. The computer-implemented method of claim 1, further comprising generating the electronic communication utilizing the communication generation neural network based on one or more content items corresponding to the user account from a content management system, wherein the one or more content items comprise digital files, video conference transcriptions, or historical electronic communication threads.

5. The computer-implemented method of claim 1, further comprising:
   receiving a user request to respond to the electronic communication thread within an assistance application comprising the communication generation neural network and the one or more composition parameters; and
   in response to the user request, causing the assistance application to:
      access the electronic communication thread; and generate, utilizing the communication generation neural network, the electronic communication to include within the electronic communication thread.

6. The computer-implemented method of claim 1, further comprising:
receiving, via an assistance application, a user request to respond to the electronic communication thread within an electronic communication platform, wherein the electronic communication platform comprises a website or an electronic communication application and the assistance application comprises a browser plugin, an application plugin, or a mobile device keyboard application; and
in response to the user request, causing the assistance application to:
access the electronic communication thread; and
generate, utilizing the communication generation neural network, the electronic communication to include within the electronic communication thread.

7. The computer-implemented method of claim 1, further comprising:
automatically accessing the electronic communication thread of the user account; and
automatically generating, utilizing the communication generation neural network, the electronic communication as a draft electronic communication saved for the user account.

8. The computer-implemented method of claim 7, further comprising:
upon receiving a user interaction requesting to view the draft electronic communication, providing, for display within a client device corresponding to the user account, an editing user interface comprising the generated draft electronic communication.

9. The computer-implemented method of claim 7, further comprising providing, for display within a notification tray interface, a notification display element comprising a representation of the generated draft electronic communication with selectable options to transmit the generated draft electronic communication, modify the generated draft electronic communication, or reject the generated draft electronic communication, wherein the notification tray interface comprises one or more notification display elements for one or more draft electronic communications.

10. The computer-implemented method of claim 1, further comprising transmitting the modified electronic communication to the additional user account within the electronic communication thread.

11. The computer-implemented method of claim 1, wherein the communication generation neural network comprises a large language model.

12. A non-transitory computer-readable medium storing instructions that, when executed by at least one processor, cause a computing device to:
access an electronic communication thread of a user account, the electronic communication thread comprising one or more electronic communications between the user account and an additional user account;
determine one or more composition parameters for generating electronic communications to include within the electronic communication thread by utilizing a communication analysis model to analyze the one or more electronic communications of the electronic communication thread;
generate, based on the one or more composition parameters, an electronic communication to include within the electronic communication thread utilizing a communication generation neural network;
receive a user prompt from a user interaction to modify the generated electronic communication; and
utilize the user prompt with the communication generation neural network to generate a modified electronic communication.

13. The non-transitory computer-readable medium of claim 12, further comprising instructions that, when executed by the at least one processor, cause the computing device to generate the electronic communication utilizing the communication generation neural network based on one or more content items corresponding to the user account from a content management system.

14. The non-transitory computer-readable medium of claim 12, further comprising instructions that, when executed by the at least one processor, cause the computing device to:
receive, via an assistance application, a user request to respond to the electronic communication thread within an electronic communication platform, wherein the electronic communication platform comprises a website or an electronic communication application and the assistance application comprises a browser plugin, an application plugin, or a mobile device keyboard application; and
in response to the user request, causing the assistance application to:
access the electronic communication thread; and
generate, utilizing the communication generation neural network, the electronic communication to include within the electronic communication thread.

15. The non-transitory computer-readable medium of claim 12, further comprising instructions that, when executed by the at least one processor, cause the computing device to:
automatically access the electronic communication thread of the user account;
automatically generate, utilizing the communication generation neural network, the electronic communication as a draft electronic communication saved for the user account; and
provide, for display within a notification tray interface, a notification display element comprising a representation of the generated draft electronic communication with selectable options to transmit the generated draft electronic communication, modify the generated draft electronic communication, or reject the generated draft electronic communication, wherein the notification tray interface comprises one or more notification display elements for one or more draft electronic communications.

16. The non-transitory computer-readable medium of claim 12, further comprising instructions that, when executed by the at least one processor, cause the computing device to transmit the modified electronic communication to the additional user account.

17. A system comprising:
at least one processor; and
at least one non-transitory computer-readable storage medium storing instructions that, when executed by the at least one processor, cause the system to:
access an electronic communication thread of a user account, the electronic communication thread comprising one or more electronic communications between the user account and an additional user account;

determine one or more composition parameters for generating electronic communications to include within the electronic communication thread by utilizing a communication analysis model to analyze the one or more electronic communications of the electronic communication thread;

generate, based on the one or more composition parameters, an electronic communication to include within the electronic communication thread utilizing a communication generation neural network;

receive a user prompt from a user interaction to modify the generated electronic communication; and utilize the user prompt with the communication generation neural network to generate a modified electronic communication.

18. The system of claim 17, further comprising instructions that, when executed by the at least one processor, cause the system to:

receive, via an assistance application, a user request to respond to the electronic communication thread within an electronic communication platform, wherein the electronic communication platform comprises a website or an electronic communication application and the assistance application comprises a browser plugin, an application plugin, or a mobile device keyboard application; and in response to the user request, causing the assistance application to:

access the electronic communication thread; and generate, utilizing the communication generation neural network, the electronic communication to include within the electronic communication thread.

19. The system of claim 17, further comprising instructions that, when executed by the at least one processor, cause the system to:

automatically access the electronic communication thread of the user account; and automatically generate, utilizing the communication generation neural network, the electronic communication as a draft electronic communication saved for the user account.

20. The system of claim 17, further comprising instructions that, when executed by the at least one processor, cause the system to:

identify, utilizing the communication generation neural network, a digital content item corresponding to the user account based on the one or more composition parameters, the one or more digital content items corresponding to the user account, or the electronic communication thread; and automatically attach the identified digital content item to the generated electronic communication.

* * * * *